(12) United States Patent
Bovet et al.

(10) Patent No.: US 10,310,728 B2
(45) Date of Patent: Jun. 4, 2019

(54) PRESENTING E-MAIL ON A TOUCH DEVICE

(71) Applicant: Apple Inc., Cupertino, CA (US)

(72) Inventors: Simon I. Bovet, Zurich (CH);
Cristobal Baray, Sunnyvale, CA (US);
Stephen O. Lemay, Palo Alto, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 15/005,959

(22) Filed: Jan. 25, 2016

(65) Prior Publication Data

US 2016/0196031 A1  Jul. 7, 2016

Related U.S. Application Data

(63) Continuation of application No. 13/647,224, filed on Oct. 8, 2012, now Pat. No. 9,245,259.

(Continued)

(51) Int. Cl.

| | |
|---|---|
| *G06F 3/0488* | (2013.01) |
| *G06F 3/0482* | (2013.01) |
| *G06Q 10/10* | (2012.01) |
| *G06F 3/041* | (2006.01) |
| *H04L 12/58* | (2006.01) |
| *G06F 8/34* | (2018.01) |
| *G06F 9/451* | (2018.01) |

(52) U.S. Cl.
CPC .......... *G06F 3/0488* (2013.01); *G06F 3/0412* (2013.01); *G06F 3/0482* (2013.01); *G06Q 10/107* (2013.01); *H04L 51/22* (2013.01); *G06F 8/34* (2013.01); *G06F 9/451* (2018.02); *G06F 2203/04803* (2013.01); *H04L 51/02* (2013.01)

(58) Field of Classification Search
CPC ..... G06F 3/0488; G06F 3/0482; G06F 3/0412
USPC ........................................................ 715/752
See application file for complete search history.

(56) References Cited

U.S. PATENT DOCUMENTS

| | | |
|---|---|---|
| 5,347,295 A | 9/1994 | Agulnick et al. |
| 5,835,084 A | 11/1998 | Bailey et al. |

(Continued)

FOREIGN PATENT DOCUMENTS

| | | |
|---|---|---|
| EP | 1674977 A2 | 6/2006 |
| EP | 2447946 A2 | 5/2012 |
| WO | 2014/168528 A1 | 10/2014 |

OTHER PUBLICATIONS

Non-Final Office Action received for U.S. Appl. No. 13/647,224, dated Dec. 17, 2014, 35 pages.

(Continued)

*Primary Examiner* — Andrea C Leggett
(74) *Attorney, Agent, or Firm* — Dentons US LLP

(57) ABSTRACT

Messages are presented so as to make effective use of the display area to convey information to the user. For example, message content of primary interest to the user (e.g., new content) can be distinguished from secondary content (e.g., content quoted from a previous message), and the message can be initially displayed with the secondary content hidden using an expandable visual indicator that the user can expand to reveal the secondary content. Different elements within a message, such as textual content and graphical content elements, can be scaled independently using magnification factors optimized for each element.

36 Claims, 31 Drawing Sheets

Related U.S. Application Data

(60) Provisional application No. 61/657,646, filed on Jun. 8, 2012.

(56) References Cited

U.S. PATENT DOCUMENTS

| | | | |
|---|---|---|---|
| 5,917,483 | A | 6/1999 | Duncan et al. |
| 6,088,696 | A | 7/2000 | Moon et al. |
| 6,426,761 | B1 | 7/2002 | Kanevsky et al. |
| 7,877,703 | B1 | 1/2011 | Fleming |
| 8,200,762 | B2 | 6/2012 | Staats |
| 8,253,695 | B2 | 8/2012 | Ganatra et al. |
| 8,555,178 | B2 | 10/2013 | Blair |
| 8,689,116 | B2 | 4/2014 | Guzman et al. |
| 9,245,259 | B2 | 1/2016 | Bovet et al. |
| 2004/0021676 | A1 | 2/2004 | Chen et al. |
| 2005/0005235 | A1 | 1/2005 | Satterfield et al. |
| 2005/0160372 | A1 | 7/2005 | Gruen et al. |
| 2005/0223057 | A1* | 10/2005 | Buchheit ............ G06Q 10/107 709/203 |
| 2006/0026521 | A1 | 2/2006 | Hotelling et al. |
| 2006/0047811 | A1 | 3/2006 | Lau et al. |
| 2006/0123360 | A1 | 6/2006 | Anwar et al. |
| 2006/0125803 | A1 | 6/2006 | Westerman et al. |
| 2006/0250834 | A1 | 11/2006 | Chinn et al. |
| 2007/0011258 | A1 | 1/2007 | Khoo |
| 2007/0150830 | A1 | 6/2007 | Ording et al. |
| 2008/0086703 | A1 | 4/2008 | Flynt et al. |
| 2008/0094369 | A1 | 4/2008 | Ganatra et al. |
| 2009/0319618 | A1* | 12/2009 | Affronti ............ G06Q 10/107 709/206 |
| 2009/0319911 | A1* | 12/2009 | McCann ............ G06Q 10/107 715/752 |
| 2010/0134425 | A1 | 6/2010 | Storrusten |
| 2011/0035681 | A1 | 2/2011 | Mandel et al. |
| 2011/0163970 | A1* | 7/2011 | Lemay ............ G06F 3/04883 345/173 |
| 2012/0131516 | A1 | 5/2012 | Chiu et al. |
| 2012/0185797 | A1 | 7/2012 | Thorsen et al. |
| 2012/0192057 | A1 | 7/2012 | Migos et al. |
| 2012/0210214 | A1 | 8/2012 | Yoo et al. |
| 2013/0014057 | A1 | 1/2013 | Reinpoldt et al. |
| 2013/0054711 | A1* | 2/2013 | Kessner ............ G06Q 10/107 709/206 |
| 2013/0167082 | A1 | 6/2013 | Joo et al. |
| 2013/0227454 | A1 | 8/2013 | Thorsander et al. |
| 2013/0246955 | A1 | 9/2013 | Schwesig et al. |
| 2014/0304651 | A1 | 10/2014 | Johansson et al. |
| 2016/0048316 | A1 | 2/2016 | Bae et al. |
| 2016/0299657 | A1 | 10/2016 | Howarth et al. |
| 2017/0063749 | A1* | 3/2017 | Gupta ............ G06Q 10/109 |

OTHER PUBLICATIONS

Notice of Allowance received for U.S. Appl. No. 13/647,224, dated Aug. 14, 2015, 7 pages.

Final Office Action received for U.S. Appl. No. 11/850,630, dated Jan. 28, 2011, 20 pages.

International Preliminary Report on Patentability received for PCT Patent Application No. PCT/US2007/077771, dated Mar. 10, 2009, 7 pages.

International Preliminary Report on Patentability received for PCT Patent Application No. PCT/US2016/024311, dated Oct. 19, 2017, 10 pages.

International Search Report and Written Opinion received for PCT Application No. PCT/US2016/024311, dated Jun. 22, 2016, 13 pages.

Non-Final Office Action received for U.S. Appl. No. 11/850,630, dated Nov. 14, 2011, 16 pages.

Non-Final Office Action received for U.S. Appl. No. 11/850,630, dated Sep. 16, 2010, 17 pages.

Non-Final Office Action received for U.S. Appl. No. 14/932,815, dated Apr. 5, 2018, 16 pages.

Notice of Allowance received for U.S. Appl. No. 11/850,630, dated Mar. 12, 2012, 10 pages.

Final Office Action received for U.S. Appl. No. 14/932,815, dated Dec. 14, 2018, 18 pages.

\* cited by examiner

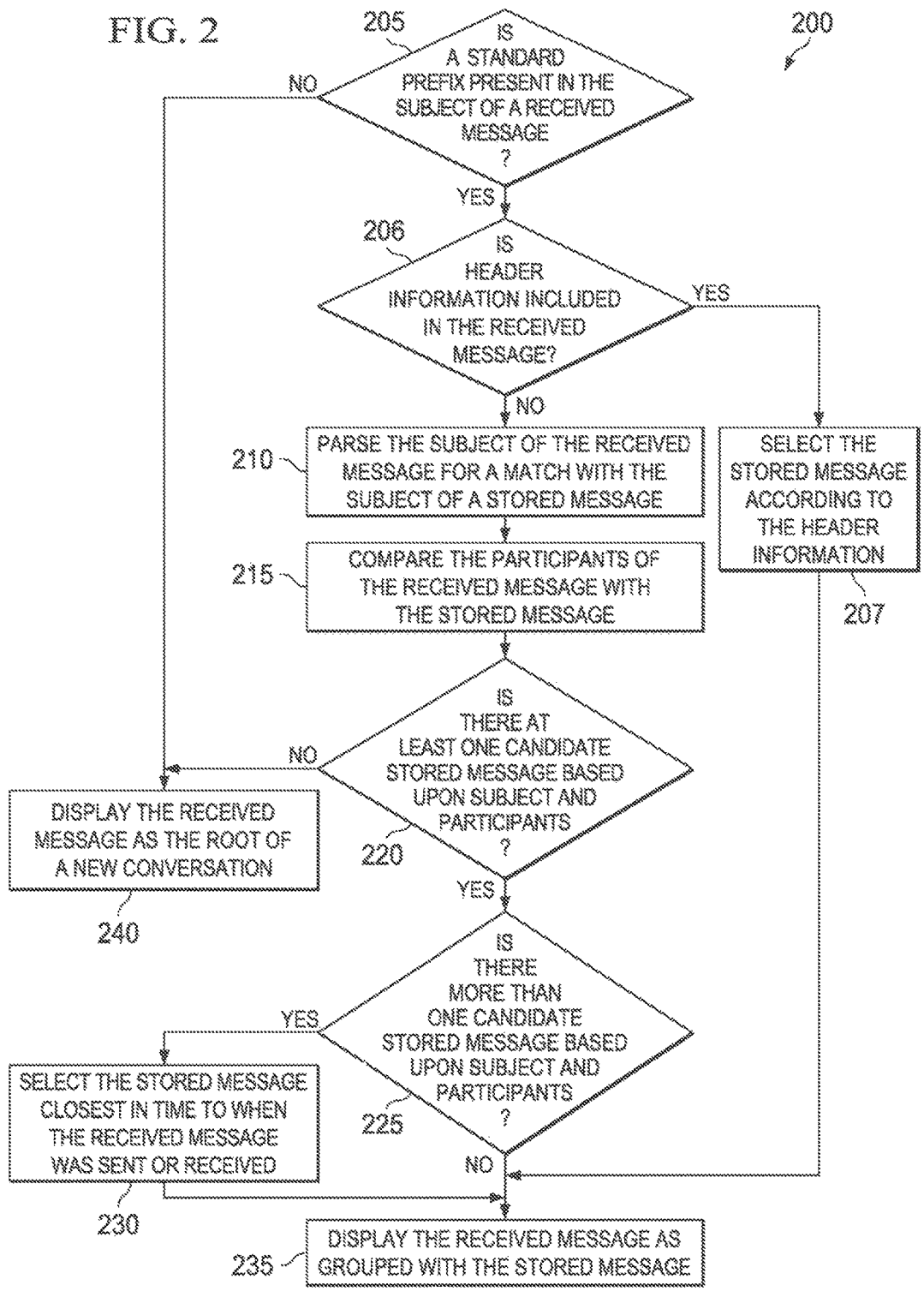

PRESENTING E-MAIL ON A TOUCH DEVICE

CROSS-REFERENCES TO RELATED APPLICATIONS

This application is a continuation of U.S. non-provisional patent application Ser. No. 13/647,224, filed Oct. 8, 2012, which claims the benefit of U.S. provisional patent application No. 61/657,646, filed Jun. 8, 2012, which is incorporated herein by reference.

The present disclosure is also related to commonly-assigned co-pending U.S. patent application Ser. No. 13/007,547, filed Jan. 14, 2011, entitled "Grouping E-mail Messages into Conversations," the disclosure of which is incorporated herein by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright 2011, Apple Inc., All Rights Reserved.

BACKGROUND

The present disclosure relates to presenting e-mail on a touch device.

An original email message and a chain or thread of related reply messages or forwarded messages can be grouped as a conversation. The embedded attributes (e.g., header information) of a message contain a unique identifier and a chain of message identifiers which can be used to relate the message to replies and forwards. Grouping messages into conversations based upon references in a message's header information alone can be unreliable. Users will often use an existing message, deleting the subject and content, to start a new conversation while being unaware that the header information is still embedded in the message. Additionally, the inclusion of header information is optional and, as a result, not all messages include header information. Reliance on header information alone is over-inclusive in the first scenario and under-inclusive in the second scenario.

Furthermore, reply messages often also include or quote text from the original message or the message to which it is replying. Once messages are grouped into a conversation, this text is often redundant and can be lengthy and distracting.

SUMMARY

Certain embodiments of the present invention relate to presenting messages, such as e-mail messages, on a display device in a manner that can make effective use of the display area to convey information to the user. In some instances, the presentation can be optimized for mobile devices with relatively small display areas.

Some aspects of the invention relate to methods for presenting messages to a user on an electronic device. A variety of devices can be used, including mobile devices with a touchscreen display and a processor. The device can receive a first user input selecting a message to view, where the message includes both primary content (e.g., new content not in a previous message) and secondary content (e.g., content that was included in a previous message that the user likely received or sent). The device can display an initial representation of the selected message that includes the primary content portion and an expandable visual element (e.g., a rendering of an accordion fold across the entire width of the message display area) indicating that the selected message includes a secondary content portion. This expandable visual element can be located within the representation at a position corresponding to a position of the secondary content portion relative to the primary content portion within the message. In response to a second user input indicating that the expandable visual element should be expanded (e.g., a dragging gesture), the device can expand the element to reveal the secondary content portion. Where the message includes multiple primary content portions interleaved with multiple secondary content portions, expandable visual elements can be used to indicate the presence of (and initially to hide) any one or more of the secondary content portions. Where multiple expandable visual elements are presented, the user can expand one or more of them, e.g., by using appropriate touch gestures.

Primary and secondary content portions can be identified using a number of techniques. One technique includes detecting a tag (such as an HTML <blockquote> tag) indicating that a portion of the message contains quoted content; the quoted content can be identified as secondary content. Other techniques include comparing the content of the message to be displayed with an earlier message to which the message of interest is a reply.

Some aspects of the invention relate to controlling the size of message elements when a message is presented in a display area of an electronic device. For example, a message to be displayed can contain a text content portion and a graphical content element (e.g., a table or image). The device can determine a first magnification factor for the text content portion and a second magnification factor for displaying the graphical content element and can display the message with the text content portion having the first magnification factor and the graphical content element having the second magnification factor. The magnification factors for text and graphical elements can be determined independently of each other and can be based on different considerations. For example, a magnification factor for text can be selected based at least in part on a text size specified by a user preference while an magnification factor for a graphical element can be selected such that the graphical element is displayed with a width that fits within the width of the message display area. Text content can also be wrapped to fit the width of the message display area. Where a message includes multiple graphical content elements, each such element can be scaled (magnified) independently, or the same magnification factor can be applied to all graphical content elements.

Other exemplary methods, apparatuses, and systems determine that an indication that a received message was sent in response to another message is present in the received message, determine that header information is included in the received message, select a stored message according to the header information, and display the received message as grouped with the stored message. For one embodiment, if the indication is present but the header information is not included in the received message, exemplary methods, apparatuses, and systems parse a stored message for at least a partial match between the subject of the received message and the subject of the stored message, contents of subject of the stored message and the received message, and sender and recipient participants of the received message and the stored message, and display the received message as grouped with the stored message. For yet another embodiment, exemplary methods, apparatuses, and systems determine that the indication is not present in the received message and display the received message as the root of a new conversation, even if the received message includes header information or a matching subject matter that may otherwise link it to a stored message. In a further embodiment, exemplary methods, apparatuses, and systems parse text of the received message for text that is redundant of text of the stored message, determine that a minimum threshold of consecutive matching characters has been reached, and display the received message with the consecutive matching characters at least partially hidden from view.

The following detailed description together with the accompanying drawings will provide a better understanding of the nature and advantages of the present invention.

BRIEF DESCRIPTION OF THE DRAWINGS

FIG. 2 is a flow chart that illustrates an exemplary method of grouping email messages into conversations.

FIG. 4 illustrates an exemplary user interface displaying multiple email messages grouped as a conversation.

FIG. 5 illustrates the exemplary user interface of FIG. 4 after expanding a conversation preview pane item.

FIG. 7 illustrates an exemplary user interface displaying email messages previews including stacked thumbnail images of attachments.

FIG. 8 illustrates the exemplary user interface of FIG. 7 in which the stacked thumbnail images include a designation of how many files are attached to the corresponding email message.

FIG. 9 illustrates the exemplary user interface of FIG. 7 in which the stacked preview thumbnails have been expanded to show a plurality of individual thumbnails.

FIG. 10 illustrates an exemplary user interface displaying multiple email messages grouped as a conversation in which each message is numbered and redundant text is at least partially hidden.

FIG. 12 illustrates another exemplary user interface displaying multiple email messages grouped as a conversation in which redundant text is at least partially hidden.

FIG. 13 illustrates the exemplary user interface of FIG. 12 in which a message is being expanded to show hidden text.

FIG. 14 illustrates the exemplary user interface of FIG. 12 in which a message has been expanded to show hidden text.

FIG. 21A illustrates a message with trailing blank lines; FIG. 21B illustrates the same message with trailing blank lines eliminated.

DETAILED DESCRIPTION

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
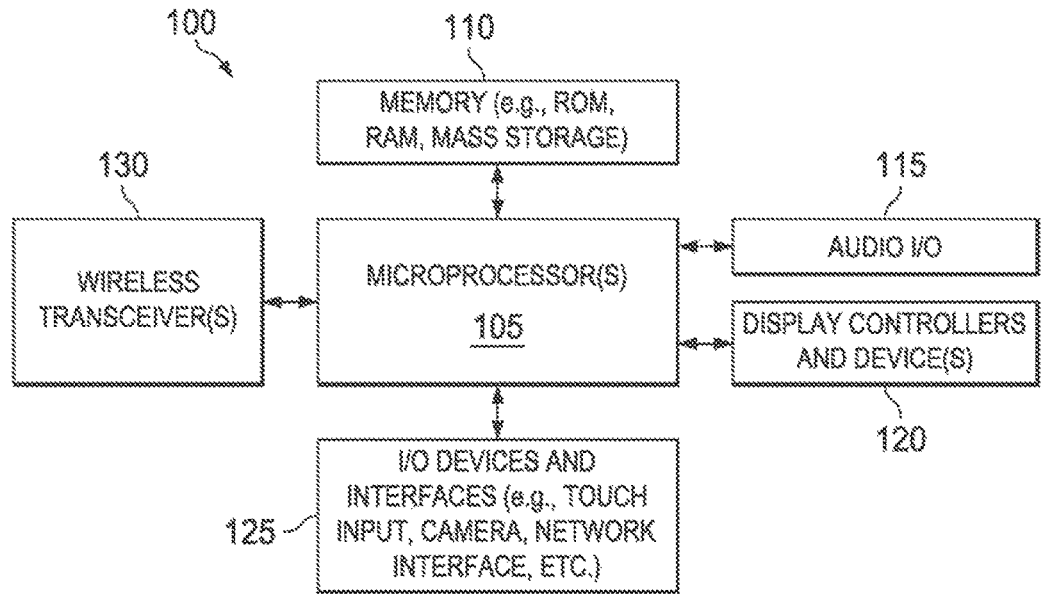
FIG. 1 illustrates, in block diagram form, an exemplary processing system that can group email messages into conversations.

FIG. 1 illustrates, in block diagram form, an exemplary data processing system 100 that can perform email message grouping and reduction of redundant text in grouped messages. Data processing system 100 may include one or more microprocessors 105 and connected system components (e.g., multiple connected chips) or the data processing system 100 may be a system on a chip.

The data processing system 100 includes memory 110 which is coupled to the microprocessor(s) 105. The memory 110 may be used for storing data, metadata, and programs for execution by the microprocessor(s) 105. The memory 110 may include one or more of volatile and non-volatile memories, such as Random Access Memory ("RAM"), Read Only Memory ("ROM"), Flash, Phase Change Memory ("PCM"), or other types of data storage.

The data processing system 100 also includes an audio input/output subsystem 115 which may include a microphone and/or a speaker for, for example, playing back music, providing telephone or voice/video chat functionality through the speaker and microphone, etc.

A display controller and display device 120 provides a visual user interface for the user; this user interface may include a graphical user interface which, for example, is similar to that shown on a Macintosh computer when running Mac OS operating system software or an iPad, iPhone, or similar device when running iOS operating system software.

Data processing system 100 also includes one or more wireless transceivers 130, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network.

It will be appreciated that one or more buses, may be used to interconnect the various components shown in FIG. 1.

The data processing system 100 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing system 100 may be a network computer or an embedded processing device within another device or consumer electronic product.

The system 100 also includes one or more input or output ("I/O") devices and interfaces 125 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 100. The I/O devices and interfaces 125 may include a connector for a dock or a connector for a USB interface, FireWire, etc. to connect the system 100 with another device, external component, or a network.

It will be appreciated that additional components, not shown, may also be part of the system 100, and, in certain embodiments, fewer components than that shown in FIG. 1 may also be used in a data processing system 100. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 110 or other machine-readable storage medium. The software may further be transmitted or received over a network (not shown) via a network interface device 125. In various embodiments, hardwired circuitry may be used in combination with the software instructions to implement the present embodiments. Thus, the techniques are not limited to any specific combination of hardware circuitry and software, or to any particular source for the instructions executed by the data processing system 100.

FIG. 2 is a flow chart that illustrates an exemplary method 200 of grouping email messages. At block 205, the data processing system 100 determines if the received email message includes an indication that the received email message was sent in response to another email message. For example, the data processing system 100 determines if a standard prefix is present in the subject field of a received email message. For one embodiment, the standard prefix indicates that the received message is a reply message (e.g., including the prefix "Re:"). For one embodiment, the data processing system 100 also parses the subject field of the received message for non-standard prefixes, repeated prefixes, suffixes, or other patterns that indicate that the message is a reply. Alternatively, another prefix is included in the subject (e.g., indicating that the message is a forward and including the prefix "Fwd:"). Exemplary prefixes (in a plurality of languages) include: re, atb., ats., aw, ha, odgovor, odp, per, r, sv, vs, ynt, АП, Ҝayan, OTH, उत्तर, समाधान, शेल, 答复, 回信, HA, 人, ن— fwd, fw, >>, ed, fs, I, ILT, Pārs., pd, Persiqsta, Proslijedi, rv, tr, vb, vl, vs, wg, ПР, ПрепраТеНо, अग्रेषित, आगे, शेल, 转发, ته.ای~مجر . Exemplary repeated prefixes include repetitions in the same language (e.g., "Re: Re: Hello") and repetitions in multiple languages (e.g., " शेल : Re: Hello"). Exemplarysuffixes include "Even better recipe (was: Best recipe)" and "How do I cook a turkey [SOLVED]." For an alternate embodiment, the data processing system 100 determines if the received email message includes another indication that the received email message was sent in response to another email message such as header information or metadata describing the received message as a response. For the ease of description, exemplary embodiments described herein refer to a standard prefix, which is interchangeable with another indication that the received email message was sent in response to another email.

At block 206, if the prefix is present, the data processing system 100 determines if header information is included in the received message. For example, the data processing system 100 checks for reference header data or in-reply-to header data to identify a stored message. For one embodiment, header information refers to Common Internet Message Headers, e.g., as described in Request for Comments ("RFC") 2076, which contain a references field (per RFC 822) comprised of a list of related messages often using Message-ID's (per RFC 1036). As used herein, header information refers to header data or metadata that identifies messages that are related to a received message. For one embodiment, the header information is distinct from the indication that the received email message was sent in response to another email.

For an alternate embodiment, if the prefix is not present but the sender of the received message is from an automated sender or on a user-defined list of participants, the data processing system 100 proceeds by parsing the subject and sender of the received message for a match with the subject and sender of a stored message. If a matching stored message is found, the received message is grouped with the stored message.

At block 207, if header information is present, the data processing system 100 selects the stored message identified by the header information as a part of a conversation to which the received message belongs. At block 235, the received message is displayed as grouped with the selected stored message.

FIGS. 3A-3D illustrate exemplary groupings of email messages according to header information. For one embodiment, in addition to grouping the received message with the selected stored message, the data processing system 100 determines if any other stored messages should be grouped as part of the conversation. For example, referring to FIG. 3A, a conversation of three messages, A, B, and C, is exchanged, such that B is a reply to A and C is a reply to B.

If message B only includes header information that references message A, message C only includes header information that references message B, and messages A and C are processed prior to message B, messages A and C would be deemed to be separate conversations based upon the included header information and the absence of message B. Once message B is processed (indicated by bold highlighting in FIG. 3A), it would be grouped with message A as described above with reference to blocks 207 and 235. Additionally, the data processing searches for stored messages that include header information that reference message B. Message C is determined to reference message B and message C is merged into the conversation grouping of messages A and B. The grouping of messages A, B, and C into a single conversation is illustrated by the broken line circle around all three messages. For one embodiment, if message C included any further messages (e.g., replies to message C), they would be merged into the conversation grouping of messages A and B as well.

Figure 3A:
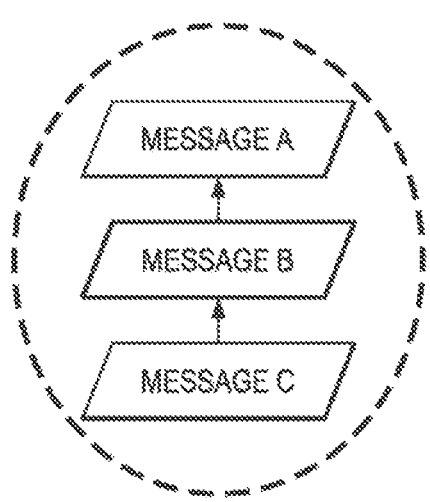
FIGS. 3A-D illustrate an exemplary grouping of email messages according to header information.
Figure 3B:
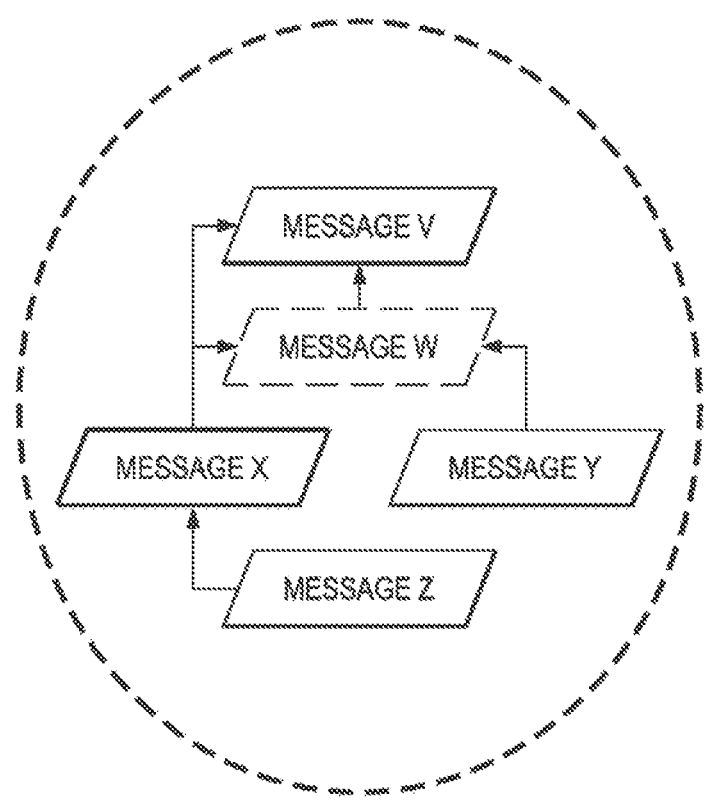

For yet another example, referring to FIG. 3B, a conversation of five messages, V, W, X, Y, and Z is exchanged. Message W is a reply to message V, messages X and Y are replies to message W, and message Z is a reply to message X. In this example, message X includes header information that references messages V and W, message Y only includes header information that references message W, and message Z only includes header information that references message X. If messages V, Y, and Z all processed prior to (or without processing) messages W and X, each of the three messages V, Y, and Z would be treated as separate conversations because they either don't reference another message (in the case of message V) or reference separate unprocessed messages (in the case of messages Y and Z). When the data processing system 100 processes message X (indicated by the bold highlighting of message X), message X is grouped with message V because it references message V. Additionally, message Z is grouped into the conversation with messages V and X because message Z references message X. Lastly, message Y is grouped into the conversation with messages V, X, and Z because both message X and message Y commonly reference message W (which has yet to be processed, indicated by the broken line around message W). The grouping of messages V, X, Y and Z into a single conversation is illustrated by the broken line circle around all four messages.

For one embodiment, the header information includes identifiers for all messages in a chain of messages that precede the current, received message. For example, in FIG. 3C, a first email message 305 is the original message in a conversation. A second email message 310 is a reply to the first email message 305. The fourth and fifth email messages 320 and 325 are replies to a third email message 315 that has yet to be processed (e.g., it has been sent but not received or has not otherwise been processed by the data processing system 100). The header information for the fourth and fifth email messages 320 and 325, however, also link them to the first and second email messages 305 and 310. In determining how to group the fourth and fifth email messages 320 and 325, the data processing system 100 determines that the fourth and fifth email messages 320 and 325 each contain a prefix and looks for the most recent message without a prefix in the chain of email messages linked by the header information included in the fourth and fifth email messages 320 and 325. The first email message 305 is only message in the chain of email messages without a prefix. The same process is applied to the second email message 310. As a result, the first, second, fourth, and fifth email messages 305, 310, 320, and 325 are all grouped as a single conversation based upon the original message 305 (as illustrated by the broken line circle around the four messages). These four messages are grouped as single conversation based upon the second, fourth, and fifth messages 310, 320, and 325 including header information linking them to the first email message 305 (and/or to each other), the inclusion of a prefix in each of the subject lines of the second, fourth, and fifth messages 310, 320, and 325, and the lack of a prefix in the subject line of the first message 305. The messages are grouped as a single conversation, despite the fact that the contents of the subject line following the prefix has changed in the fourth and fifth email messages 320 and 325.

Figure 3C:
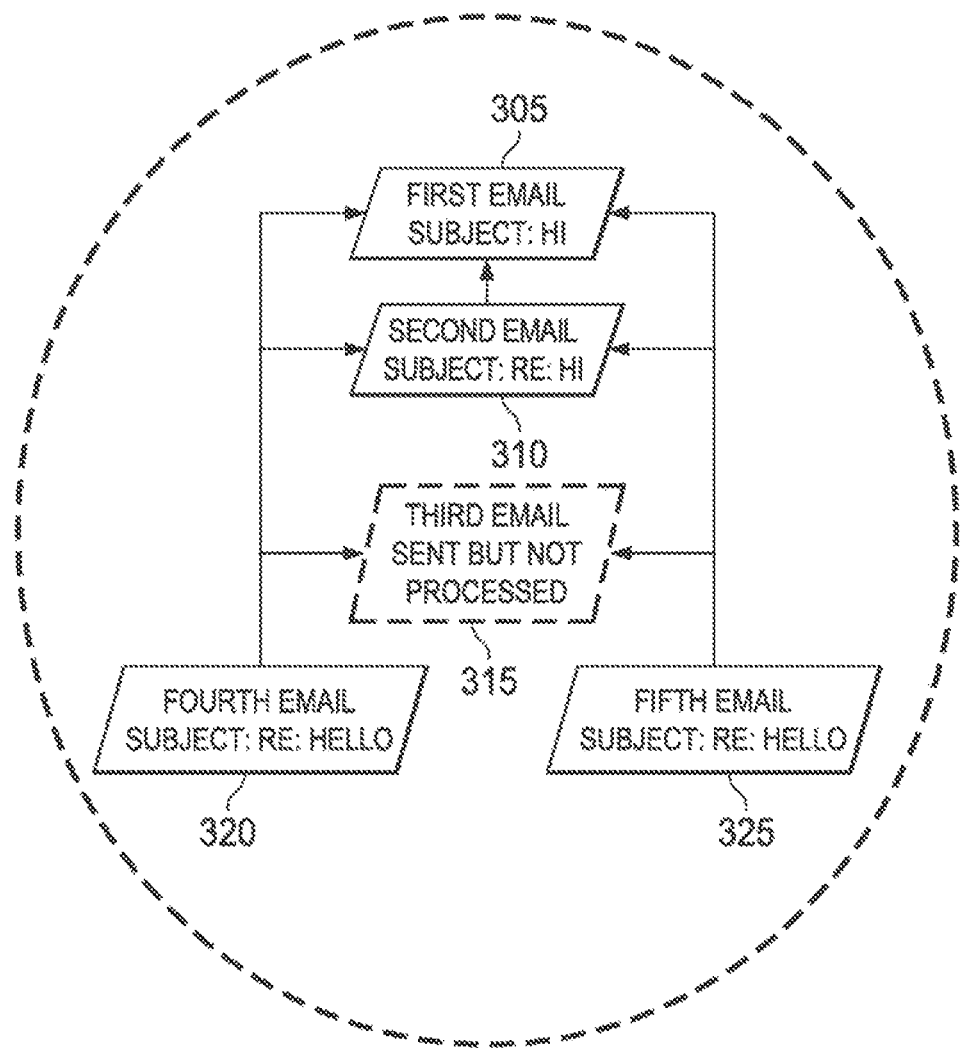
Figure 3D:
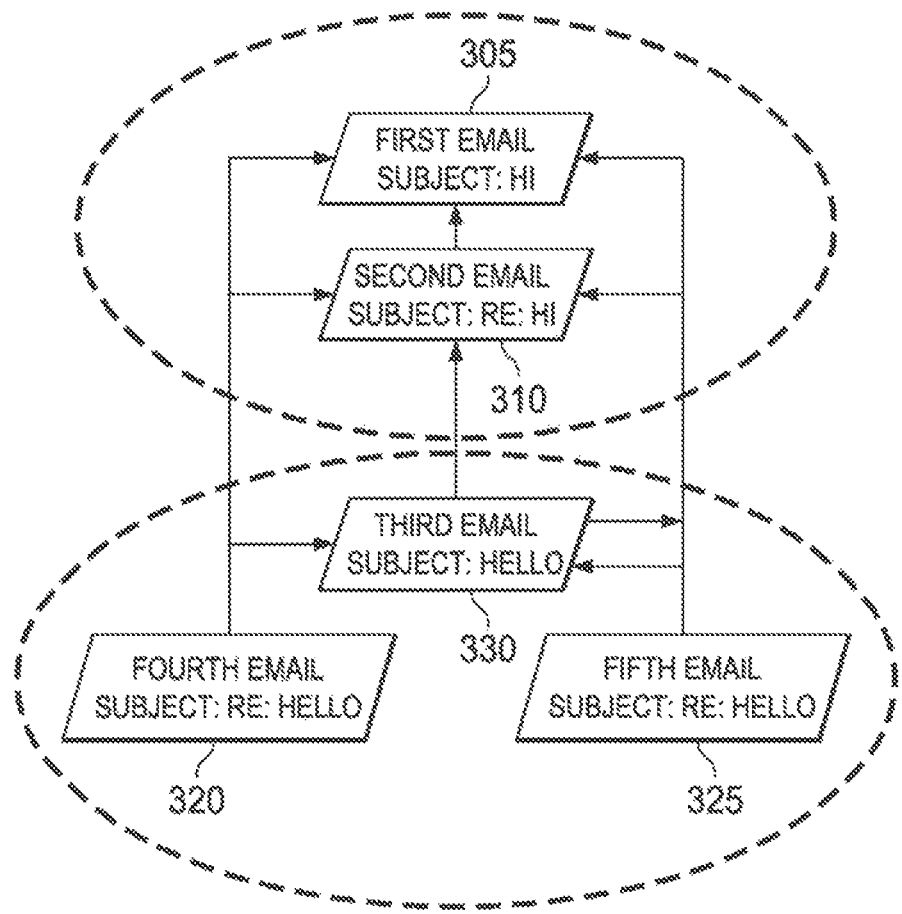

Once the third email message 330 is received and processed (illustrated as a solid line in FIG. 3D as compared to a broken line in FIG. 3C), the same process as described with reference to FIG. 3C is applied to the third email message 330. Given that the third email message 330 does not include a prefix, the data processing system 100 determines that the third email message 330 is the root/beginning of a new conversation and is not grouped with the first and second email messages 305 and 310, despite the fact that the third email message 330 contains header information linking it to the first and second email messages 305 and 310. Additionally, the data processing system 100 examines the existing conversation grouped around the first email message 305 to determine if any messages should be grouped with the third email message 330 as a separate conversation. The fourth and fifth email messages 320 and 325 are replies to a third email message 330 and include header information referencing the third email message 330, and the third email message 330 is the most recent message (relative to the fourth and fifth email messages 320 and 325) in the chain of messages without a prefix. The data processing system 100 splits the fourth and fifth email messages 320 and 325 from the original conversation and groups them with the third email message 300. While the header information links all of the illustrated email messages in the chain, the data processing system 100 has created two separate conversations based upon the presence of a prefix or lack thereof in the chain of messages (conversation groupings are illustrated by the broken line circles).

Returning to the method 200 in FIG. 2, at block 210, if header information is not available (and again, if the prefix is present), the data processing system 100 parses one or more stored messages for a match between the contents of the subject of the stored message(s) and what follows the prefix in the subject of the received message (or, in the case of a received message without a prefix but from an automated sender/sender on a user-defined list of participants, just the subject of the received message). For one embodiment, the data processing system 100 seeks an exact match between the subject contents that follow the prefix in the received message and the contents of the stored message. For example, the data processing system 100 performs a character by character comparison of the two subjects to determine if there are any differences. For an alternate embodiment, the data processing system 100 allows for a threshold of difference between the subjects that will still result in a match. For one embodiment, if the subject of the stored message contains a prefix, that prefix is ignored for the purpose of the match.

At block 215, the data processing system 100 compares the (sender and recipient) participants of the received message with the stored message. For one embodiment, the comparison results in a match if two participants are the same in both the received message and the one or more stored messages that have a matching. Alternatively, a match is made when all of the participants are the same in both the received message and the stored message. For one embodiment, the data processing system 100 selects the stored message with the most participants in common. For an additional embodiment, the data processing system 100 gives preference in matching to a user-defined list of participants.

At block 220, the data processing system 100 determines if there is at least one candidate stored message based upon the subject and participant comparisons. If so, at block 225, the data processing system 100 determines if there is more than one candidate stored message based upon the subject and participant comparisons. For one embodiment, multiple candidates are a part of the same conversation. Alternatively, the two or more candidates are not part of the same conversation.

For an alternate embodiment, the data processing system 100 determines if there is at least one candidate stored message based upon quoted text included in the received message. For example, the data processing system 100 could perform a comparison between quoted text and the body text of stored messages.

At block 230, if there is more than one candidate stored message, the data processing system 100 selects the candidate stored message that was sent or received closest in time to when the received message was sent or received. For example, if two messages from a single conversation are deemed candidates, the data processing system 100 will group the received message with the stored message that was sent or received closest in time to the received message. All three messages may be grouped as a part of the same conversation, but by using the time difference between messages, the conversation can be displayed in chronological order.

At block 235, if there is only one candidate stored message, or after selecting among candidates, the data processing system 100 displays the received message as grouped with the (selected) candidate stored message.

If, at block 205, a standard prefix is not present in the subject field of the received message, or if, at block 220, a candidate stored message is not found based upon subject and/or participants, the data processing system 100, at block 240, displays the received message as the root of a new conversation. For example, the received message may include header information identifying a stored message as the root (e.g., the start of a conversation) or as a predecessor to the received message (e.g., the received message was in response to a message in a chain of messages that was subsequent to the start of the conversation). Despite the header information, the lack of the standard prefix indicates that the received message is the root or start of a new conversation. If the received message includes header information, however, the header information is used to determine if any previously processed messages should be grouped with the received message as described above (e.g. messages sent in response to the received message but processed prior to the received message).

Figure 4:
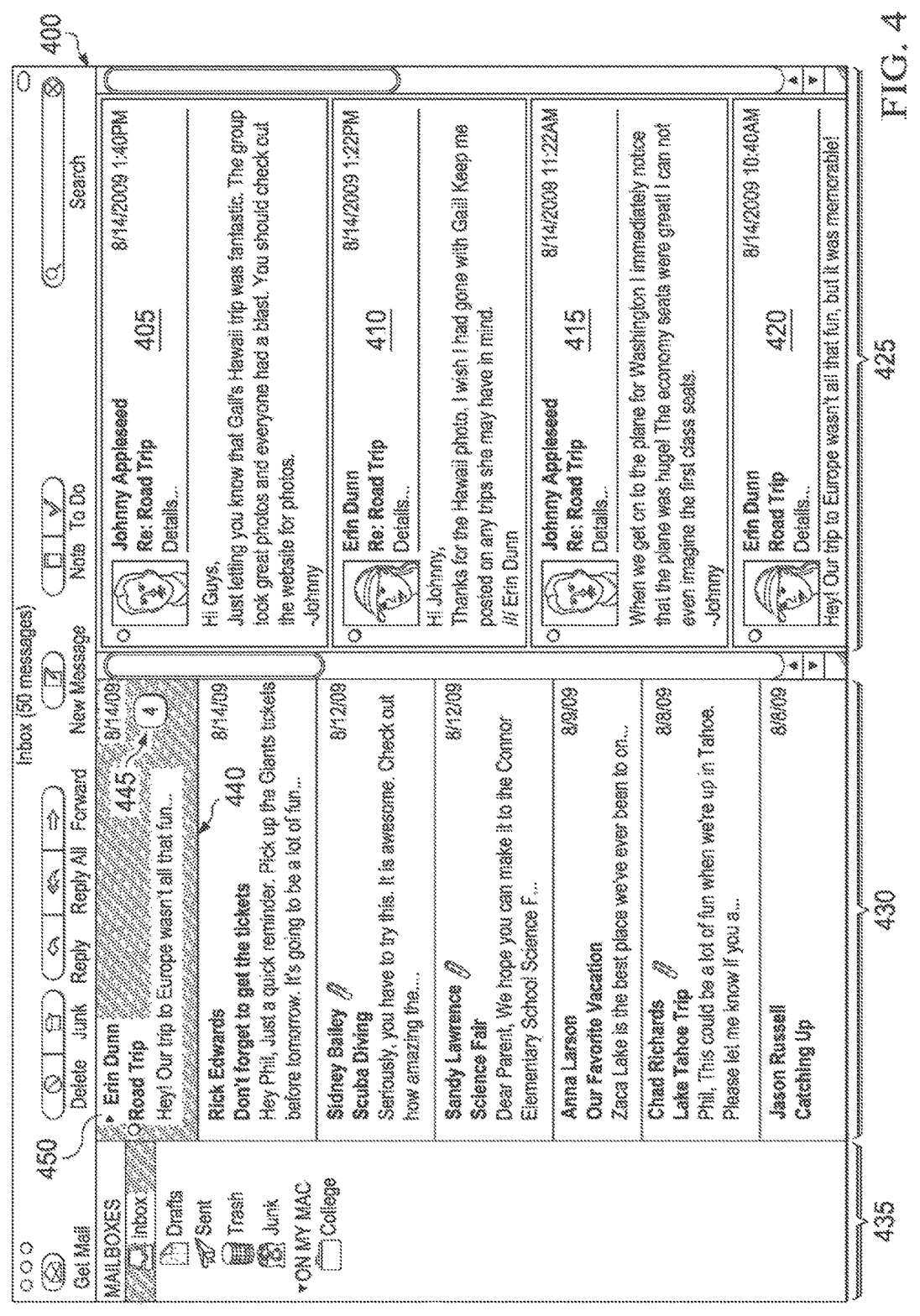

FIG. 4 illustrates an exemplary user interface displaying multiple email messages grouped as a conversation. The email window 400 displays a chain of messages 405, 410, 415, and 420. For one embodiment, the chain of messages is displayed in chronological order from the most recent message 405 to the oldest, original message 420.

For one embodiment, the email window 400 includes multiple panes. For example, the chain of messages is shown in a message pane 425 while a plurality of different messages or conversations is listed in a preview pane 430. For example, a preview pane item may include one or more of the sender of a message, at least a portion of the subject of the message, at least a portion of the body of the message, a date or time when the message was sent, attachment previews, etc. The selection of an item in preview pane 430 results in displaying a message or conversation in the message pane 425.

For one embodiment, the email window 400 also includes a mailboxes pane 435 that includes multiple mailboxes, folders, or other sources for messages. For example, the inbox is currently selected in mailboxes pane 435, which results in the messages and conversations contained in the inbox being displayed as preview pane items in the preview pane 430.

For one embodiment, preview pane items include an indication when an item represents a conversation (as opposed to a single message). For example, the selected preview pane item 440 includes a badge 445 that designates that there are four messages that are a part of this conversation. For one embodiment, when the preview pane item represents a conversation, the preview pane item only displays content from one of the messages in the conversation. For example, the selected preview pane item 440 includes an excerpt of the original message 420. Alternatively, the preview pane item displays content from the most recent message in the conversation or another message in the conversation.

For one embodiment, preview pane items that represent a conversation can be expanded to display sub-items for each message in the conversation. The preview pane item may be expanded in response to a user input. For example, preview pane item 440 includes a selectable expansion arrow 450.

Figure 5:
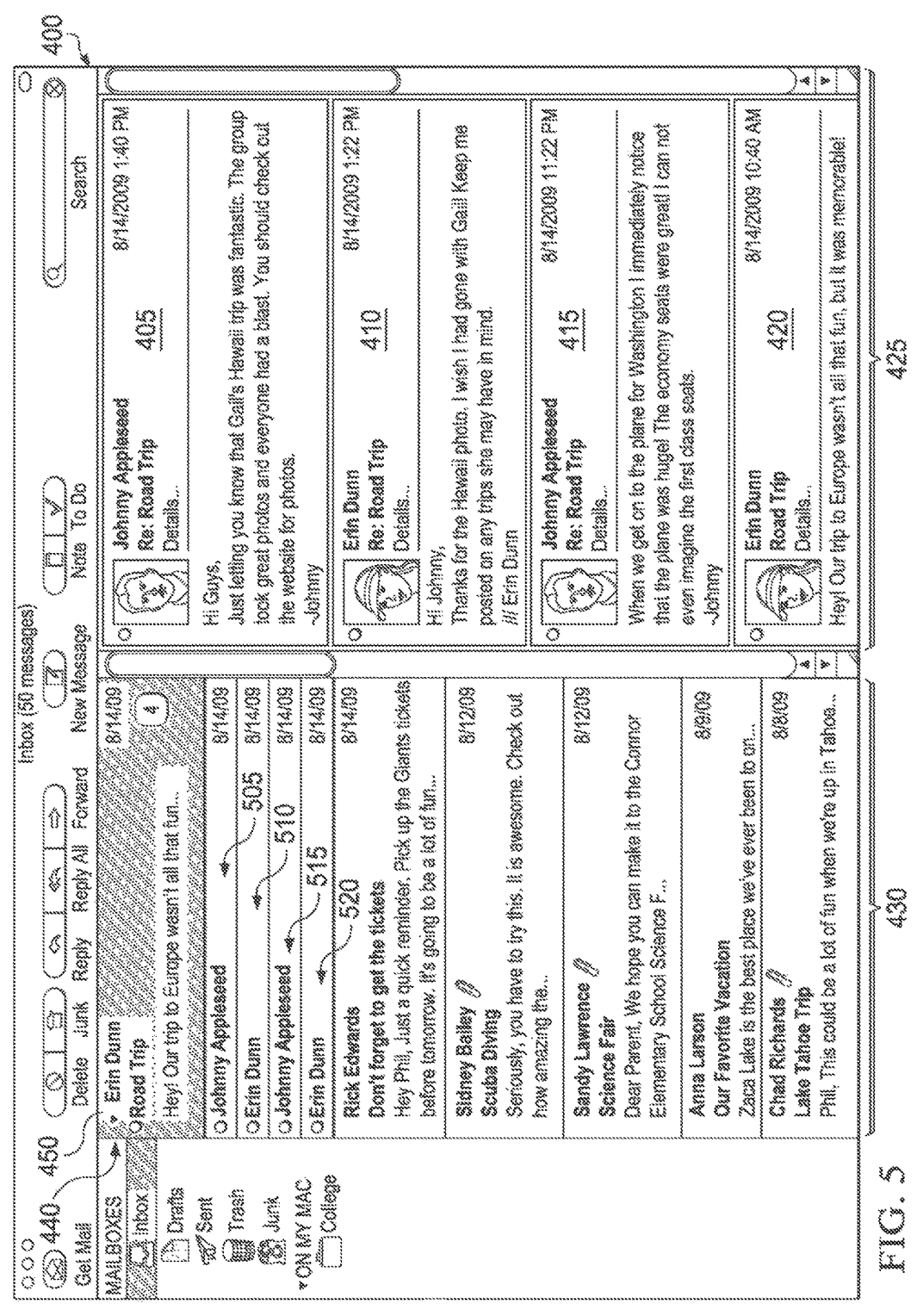

FIG. 5 illustrates the exemplary user interface of FIG. 4 after expanding a conversation preview pane item 440 by, e.g., clicking on the expansion arrow 450, selecting an option in a drop-down menu, etc. The expanded conversation preview pane item 440 includes sub-items 505, 510, 515, 520 each corresponding, respectively, to messages 405, 410, 415, and 420 in the conversation. For one embodiment, each of the sub-items 505, 510, 515, and 520 includes a minimal preview such as only one or more of the sender and date of each message. Alternatively, the sub-items 505, 510, 515, and 520 include additional preview items such as one or more of a portion of the subject of the message, a portion of the body of the message, attachment previews, etc. For one embodiment, each of the preview item 440 and sub-items 505, 510, 515, and 520 is selectable and said selection will display the entire conversation or only a particular message in the message pane 425. For example, in FIG. 5, preview item 440 is selected and, as a result, the conversation is displayed in message pane 425.

Figure 6:
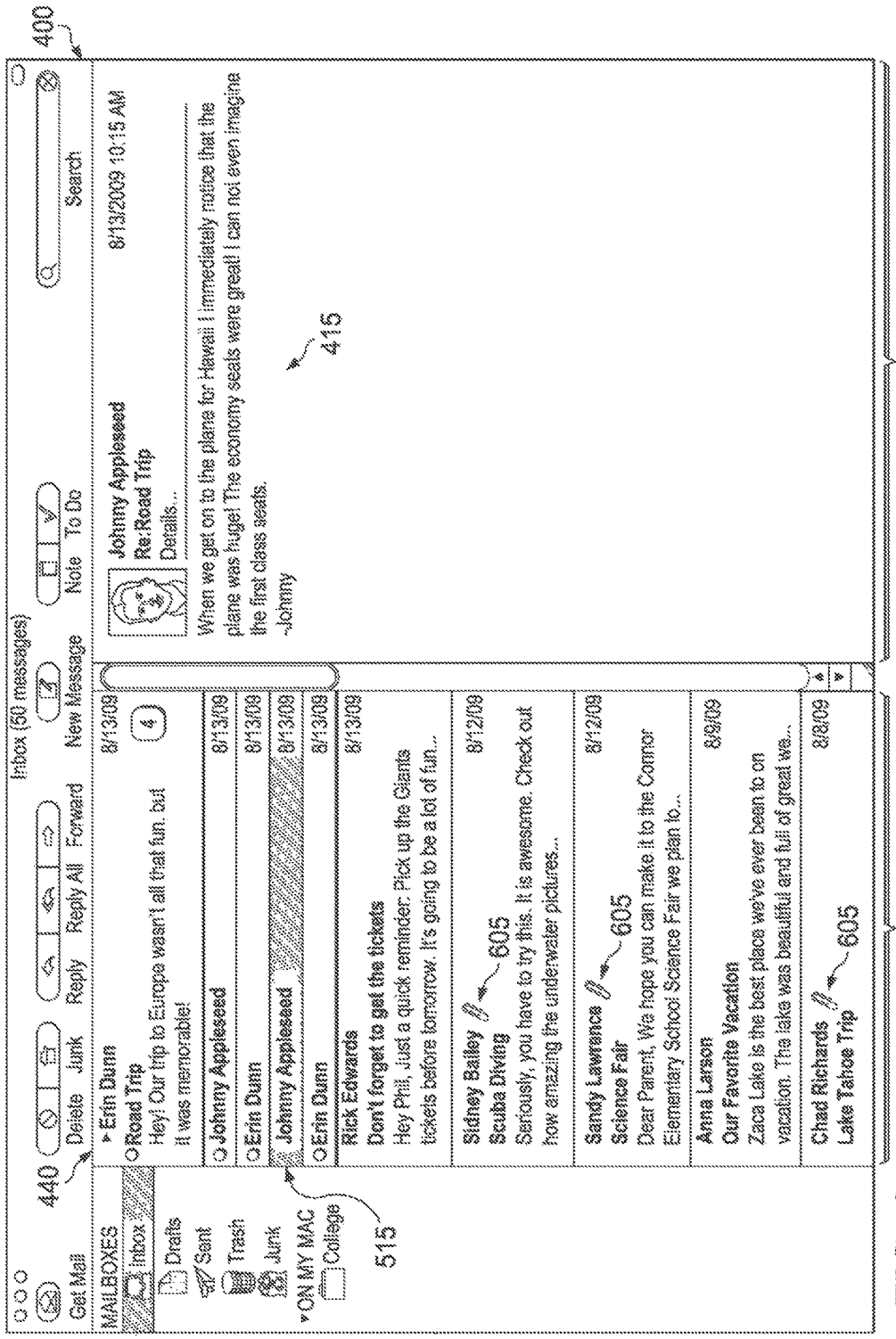
FIG. 6 illustrates the exemplary user interface of FIG. 5 in which the conversation preview pane item has been expanded and a sub-item has been selected.

FIG. 6 illustrates the exemplary user interface of FIG. 5 in which the conversation preview pane item 440 has been expanded and a sub-item 515 has been selected. In this exemplary embodiment, the selection of a sub-item 515 results in only its corresponding message 415 being displayed in message pane 425. Alternatively, for one embodiment, the selection of the sub-item 515 maintains the display of the conversation and results in the corresponding message 415 being highlighted, bolded, or displayed in another matter to draw a distinction between message 415 and messages 405, 410, and 420. For one embodiment, selecting a sub-item 515 results in scrolling the corresponding message 415 in the message pane 425 to a predetermined position, e.g., if the corresponding message 415 is out of the visible are of the message pane 425, the scrolling brings the message 415 into view.

For one embodiment, items displayed in preview pane 430 utilize a single icon 605 to designate that the corresponding message includes an attached file. For example, a paperclip icon is used in the exemplary illustration to let a user know (via the preview) that the sender has attached a file to the message. For an alternate embodiment, the preview pane items utilize a thumbnail image of the one or more attached files instead of or in addition to the icon 605 used commonly among the message preview items.

Figure 7:
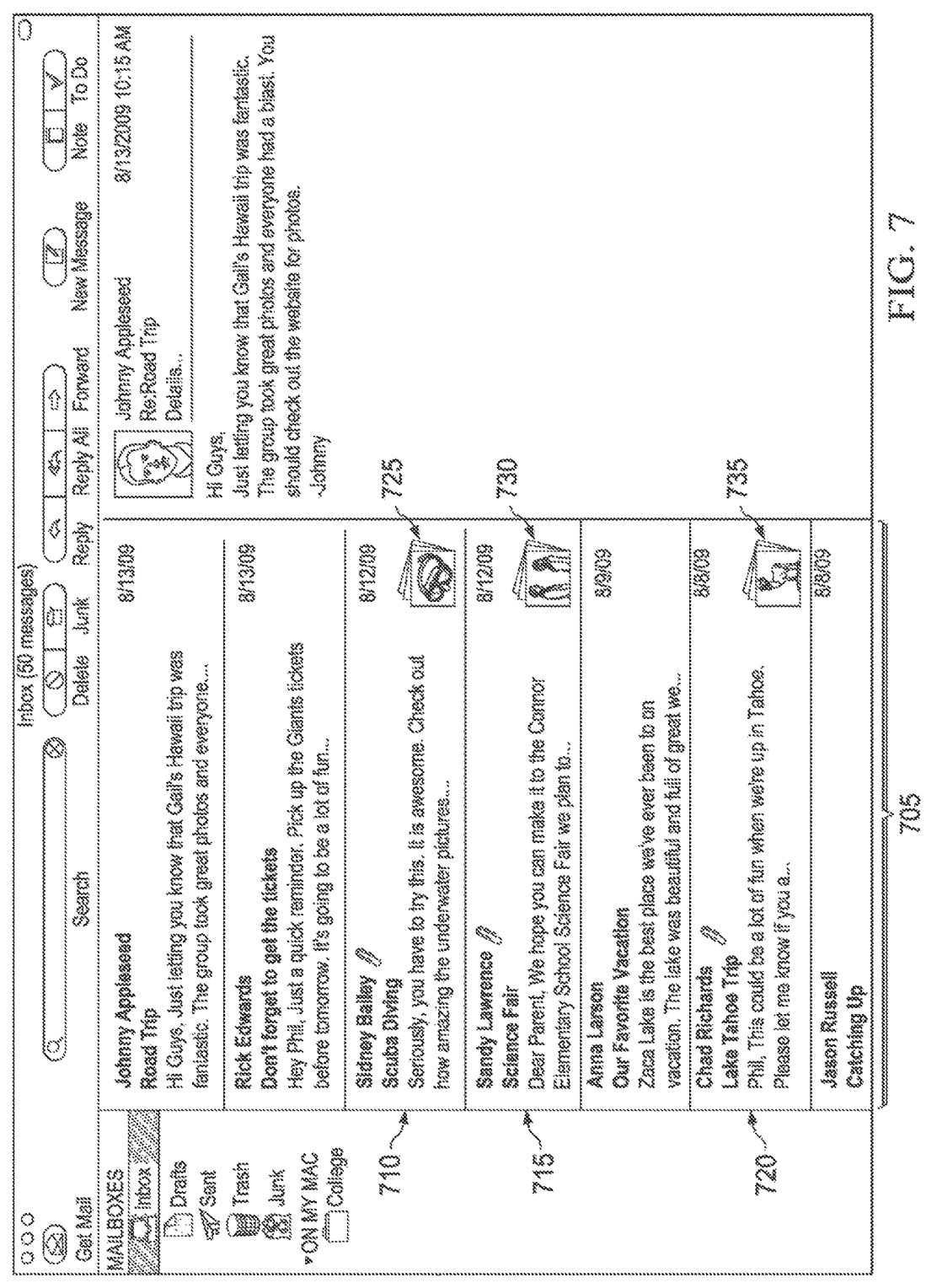

FIG. 7 illustrates an exemplary user interface in which the email messages preview items 710, 715, and 720 in the preview pane 705 include stacked thumbnail images of attachments 725, 730, and 735. For one embodiment, the stacked thumbnail images 725, 730, and 735 each represent a plurality of files attached to corresponding email messages. For example, message preview item 710 includes a stack of thumbnail images 725 giving a preview of one or more of image files attached to its corresponding email message. For one embodiment, the stack of thumbnail images 725 has the appearance of a fanned stack of photographs with the top image (of an attached file) fully visible and the other images at least partially obscured.

For one embodiment, each stack of thumbnail images 725, 730, and 735 is illustrated using a common number of stacked thumbnails, e.g., three thumbnails, with a thumbnail image of one of the files attached to the corresponding email message as the top thumbnail on the stack. For one embodiment, each stack of thumbnail images 725, 730, and 735 includes a number of stack thumbnails that corresponds to the number of files attached to each corresponding email message. For example, for a single attachment, the message preview item may only include a single thumbnail rather than a stack. For a plurality of attachments, the message preview item may include a stack of thumbnails including the same number of thumbnails as the number of attachments. For one embodiment, the number of files attached to an email message is indicated by a number placed on top of the stack.

Figure 8:
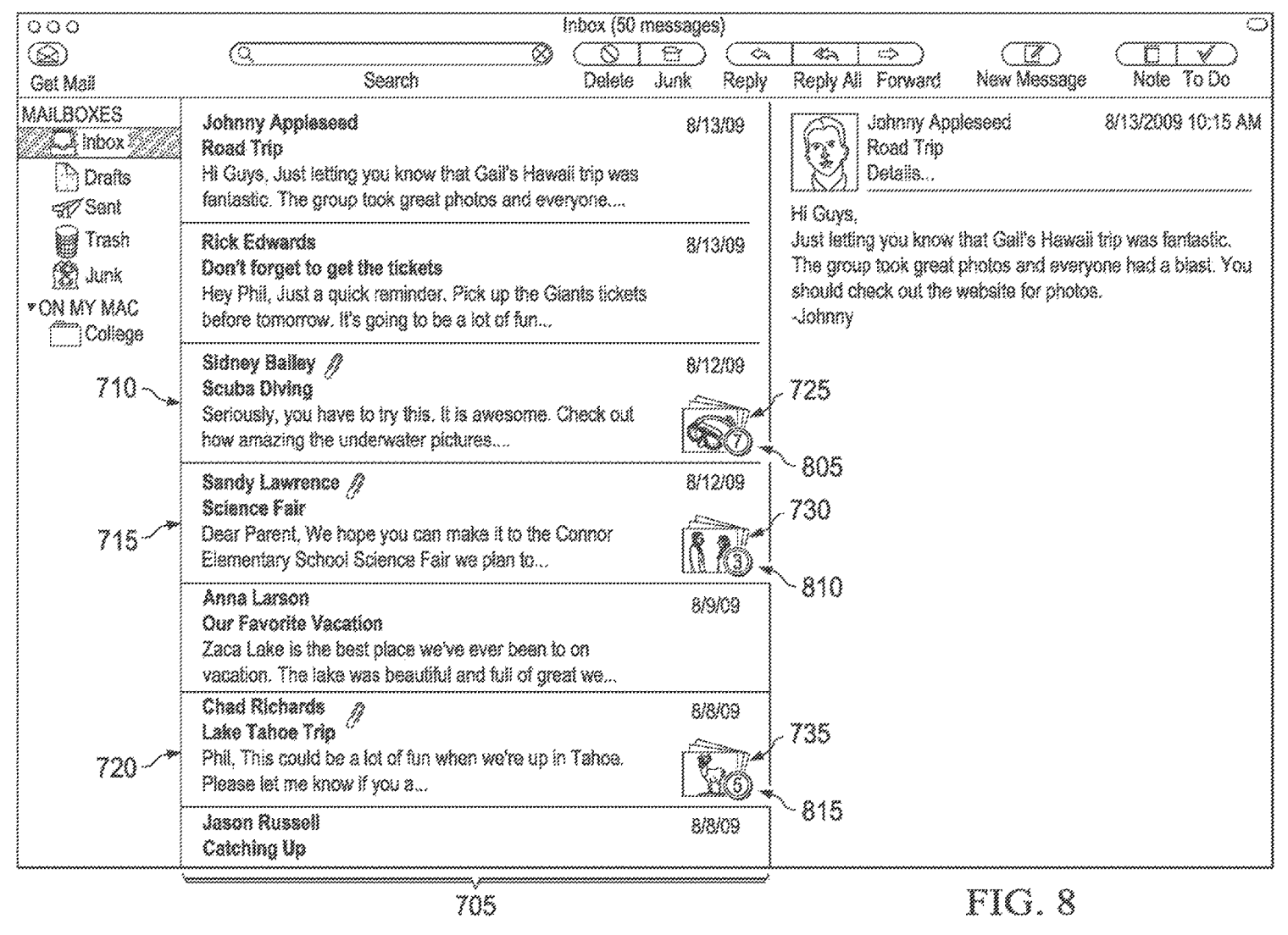

FIG. 8 illustrates the exemplary user interface of FIG. 7 in which the stacked thumbnail images 725, 730, and 735 include designations 805, 810, and 815 of how many files are attached to each corresponding email message. For example, message preview item 710 includes a stacked thumbnail image 725 with a designation 805 indicating that its corresponding email message has 7 files attached to it. Message preview item 715 includes a stacked thumbnail image 730 with a designation 810 indicating that its corresponding email message has 3 files attached to it. Message preview item 720 includes a stacked thumbnail image 735 with a designation 815 indicating that its corresponding email message has 5 files attached to it.

For one embodiment, the stacked thumbnail images 725, 730, and 735, in response to a user input, expand to show an individual thumbnail for each file attached to the corresponding email message.

Figure 9:
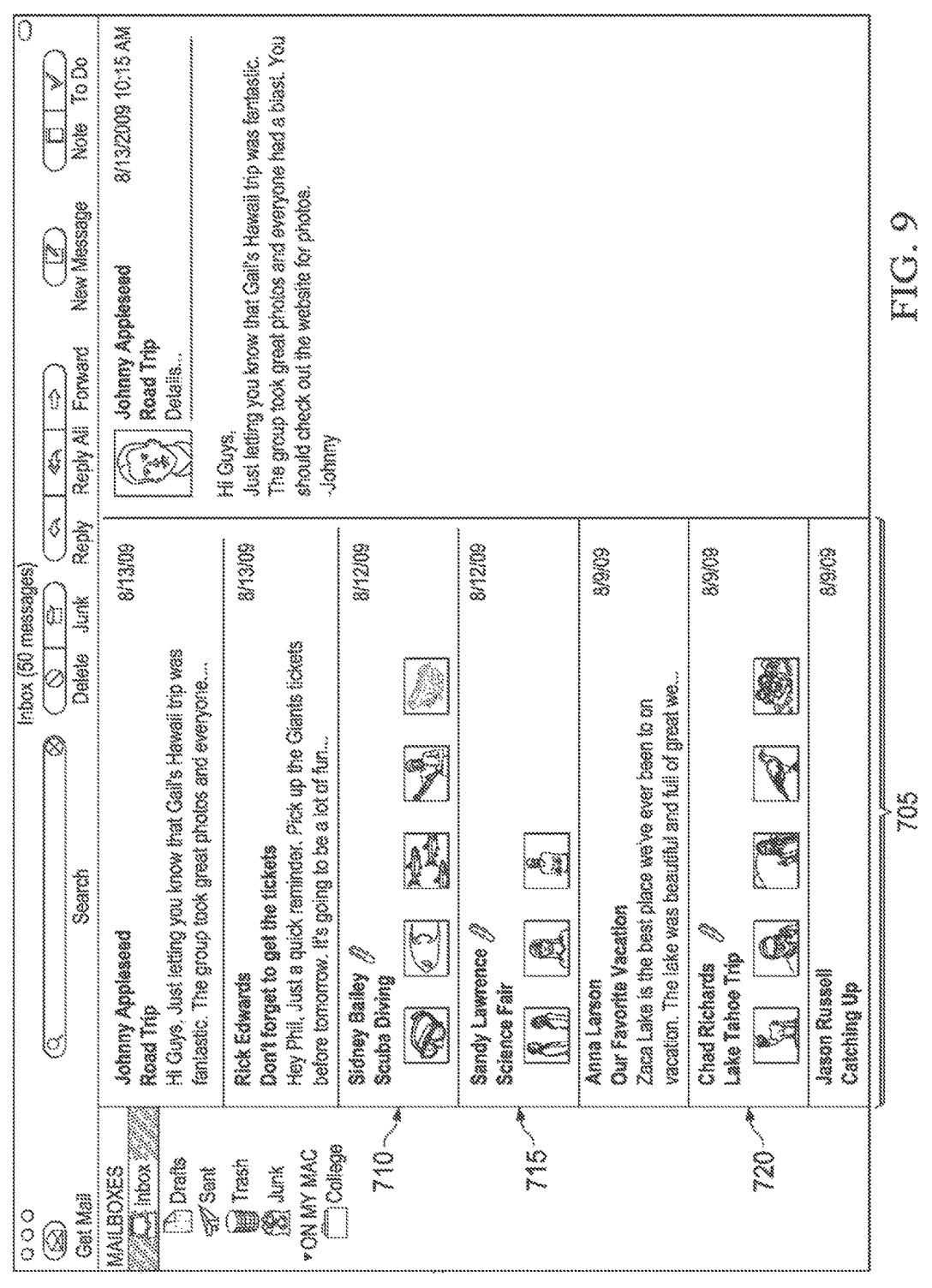

FIG. 9 illustrates the exemplary user interface of FIG. 7 in which the stacked preview thumbnails 725, 730, and 735 each have been expanded to show a plurality of individual thumbnails. For example, message preview item 715 includes three thumbnail images, each including a preview of the corresponding three files attached to the corresponding email message and message preview item 720 includes five thumbnail images, each including a preview of the corresponding five files attached to the corresponding email message. For one embodiment, the amount of thumbnails shown in a message preview item is limited. For example, message preview item 710 includes five thumbnail images representing five of the seven files attached to the corresponding email message. For an alternate embodiment, the preview item includes a scroll bar to enable a user to see all thumbnail images when they do not all fit within the preview pane 705.

Figure 10:
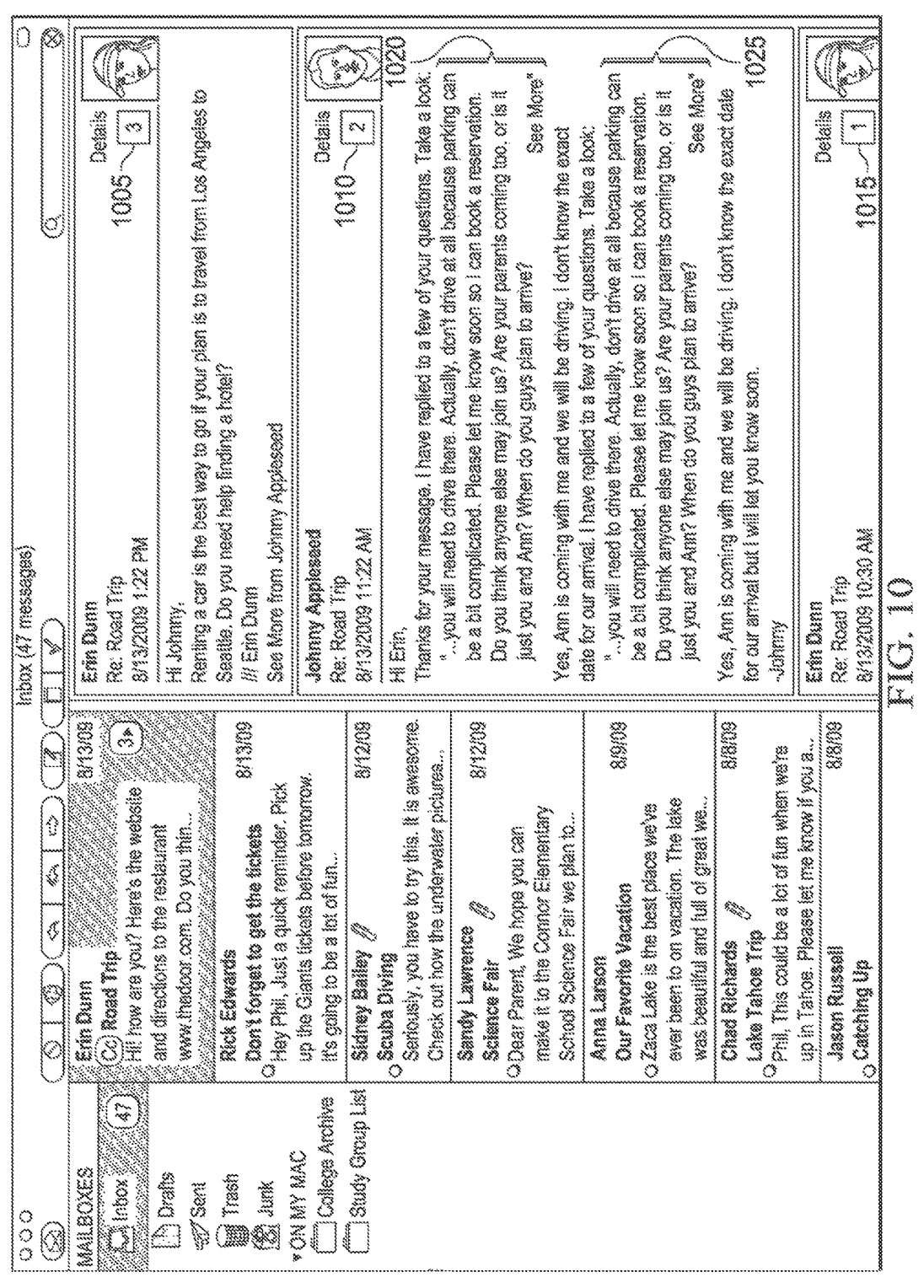

FIG. 10 illustrates an exemplary user interface displaying multiple email messages grouped as a conversation in which each message is numbered (1005, 1010, and 1015). For one embodiment the messages in a conversation are numbered according to the chronological order in which they were sent or received. Alternatively, or additionally, the messages are numbered according to a different ordering, e.g., reverse chronological order, according to the priority of the messages, only received messages are numbered, etc.

Reply messages often include or quote text from the original message or the message to which it is replying. Once messages are grouped into a conversation, this text is often redundant and can be lengthy and distracting. For one embodiment, the data processing system 100 identifies and hides redundant text in a conversation. For one embodiment, all redundant text from the original message is hidden. For example, message number 3 in the conversation illustrated in FIG. 10 includes "See More from Johnny Appleseed" to indicate that redundant text from the previous message from Johnny Appleseed has been hidden.

Alternatively, the data processing system 100 may display a small portion of the redundant text to give a reader some context as to what was text was hidden (e.g., three lines of redundant text are displayed in quotes with an ellipses to indicate that additional redundant text is hidden). For example, message number 2 in the conversation illustrated in FIG. 10 shows two quoted portions in the body of the message. For one embodiment, if the matching text is redundant text from multiple previous messages, the preview utilizes different color texts for the text from each of the previous messages. For example, if there were two messages prior to message number 2 and redundant text from each of the prior two messages was found in message number 2, the preview text from a first message would be shown in a first quote 1020 in a first color (e.g., blue) and the preview text from a second message would be shown in the other quote 1025 in a second color (e.g., green). Alternatively, multiple colors (e.g., signifying quoted language from multiple messages) are included in the same quote, all preview text is the same color, despite being from multiple messages, but different from the non-redundant text (e.g., blue is used for redundant text, while non-redundant text is black), or all text, redundant and non-redundant, is the same color.

For one embodiment, a small portion of redundant text is a preview of the redundant text. For example, the preview may be the first plurality of words or one or more sentences from the beginning or end of that block of redundant text. Alternatively, the preview includes a plurality of words from the beginning of the block of redundant text and a plurality of words from the end of the block of redundant text. For an alternate embodiment, the small portion of redundant text is a summary of the block of redundant text. For one embodiment, multiple blocks of matching text separated by non-matching text are found by the parsing and each block of matching text, if greater than threshold, is at least partially hidden (e.g., as shown in message number 2).

Figure 11:
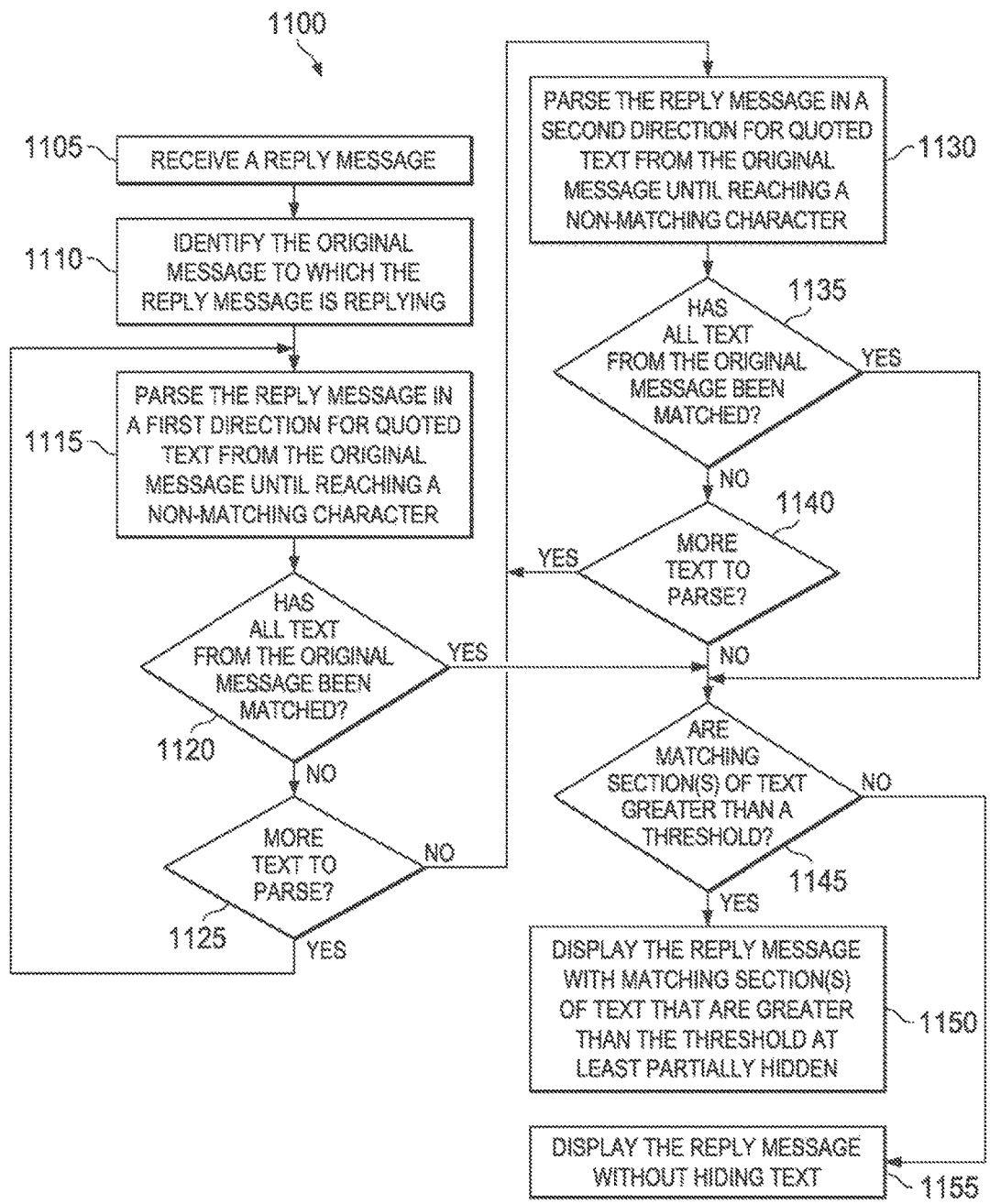
FIG. 11 is a flow chart that illustrates an exemplary method of reducing redundant text in a conversation.

FIG. 11 is a flow chart that illustrates an exemplary method 1100 of reducing redundant text in a conversation.

At block 1105, the data processing system 100 receives a reply (or forward) message. At block 1110, the data processing system 100 identifies the original message to which the reply message is replying. For one embodiment, the data processing system 100 identifies the original message using the method 200 described above. For one embodiment, if the original message cannot be found, the data processing system 100 uses other messages in the conversation to identify redundant text in the reply message.

At block 1115, the data processing system 100 parses the reply message in a first direction for redundant text from the original message until reaching a non-matching character. For one embodiment, the first direction is from the beginning of the reply message towards the end of the reply message. Alternatively, the first direction is from the end of the reply message towards the beginning of the reply message. For one embodiment, the parsing includes a character by character search of the reply message for the content of the original message. For one embodiment, the data processing system 100 sets a minimum threshold for a match. For example, the data processing system 100 may find a matching character, or matching consecutive characters, but not consider it a match until a word, string of a particular size, sentence, etc. from the original message has been matched to consecutive characters in the reply message.

For one embodiment, the minimum threshold is a line of text, i.e., a string of characters without a line break (e.g., a block-level tag such as HyperText Markup Language (HTML) tags <br>, <div>, and <p>). For example, the data processing system 100 parses the text of the reply message character by character and does not consider the reply message to include redundant text until an entire line of text in the reply message matches text from the original message.

For one embodiment, the data processing system 100 parses the reply message for a match of a first portion of the original message. Once the first portion is found, the parsing continues by searching for a match of the next portion of the original message, and so on until a non-matching character is found or until the data processing system 100 reaches the end of the original message.

At block 1120, the data processing system 100 determines if all of the text from original message has been matched to text in the reply message. If the data processing system 100 has yet to match all of the text from the original message, at block 1125, the data processing system 100 determines if there is more text to parse. For one embodiment, the data processing system 100 determines that there is no more text to parse if it has reached the end of the reply message without matching all of the content from the original message. For an alternate embodiment, the data processing system 100 determines that there is no more text to parse if it has reached a threshold of consecutive non-matching characters. If there is more text to parse in the first direction, the data processing system 100 resumes parsing at block 1115.

At block 1130, if the data processing system 100 determined that there is no more text to parse in the first direction and it has yet to match all of text from the original message, the data processing system 100 parses the reply message in a second direction for redundant text from the original message until reaching a non-matching character in a manner similar to the parsing described above with reference to block 1115. For one embodiment, the second direction is the opposite direction of the first direction.

At block 1135, the data processing system 100 determines if all of the text from original message has been matched to text in the reply message. If the data processing system 100 has yet to match all of the text from the original message, at block 1140, the data processing system 100 determines if there is more text to parse. If there is more text to parse in the second direction, the data processing system 100 resumes parsing in the second direction at block 1130.

If all the text from the original message has been found in the reply message in block 1120 or in block 1135, or if the parsing has reached the end of the second direction at block 1140, the data processing system 100 determines if any matching sections of text are greater than a threshold at block 1145. For one embodiment, the threshold for the matching sections is an amount of pixels that would be used to display the sections of matching text. Alternatively, the threshold is a minimum number of consecutive characters, a number of lines of text, etc. At block 1150, the data processing system 100 displays the reply message with one or more matching sections of text that are each greater than the threshold at least partially hidden. For one embodiment, the data processing system 100 further identifies and hides an attribute automatically added to the reply message above the block of redundant text. For example, an automatically added attribute may indicate that the text is redundant of text in the original message by including "On <date> at <time>, <name or email address> wrote:" or a block of similar text.

At block 1155, if there are no matching blocks of text, or if none of the matching blocks are greater than the threshold, the data processing system 100 displays the reply message without hiding any text.

For one embodiment, the data processing system 100 parses the reply message for a match of a first portion of the original message according to the method 1100 at multiple starting points. For example, if a match was found in the reply message for a first portion of the original message, the data processing system 100 would continue to look for all other occurrences of that first portion of the original message in the reply message and continue parsing from that point. If multiple matches are found for the first portion of the original message, the data processing system 100 determines that the match that contains the largest string of matching characters is redundant text. For one embodiment, if two matches include the same number of matching characters, the data processing system 100 determines the matching portion of text with the later starting point in the reply message is redundant text. In a further embodiment, the data processing system 100 parses the reply message for a match at multiple starting points in both the first and the second directions.

Figure 12:
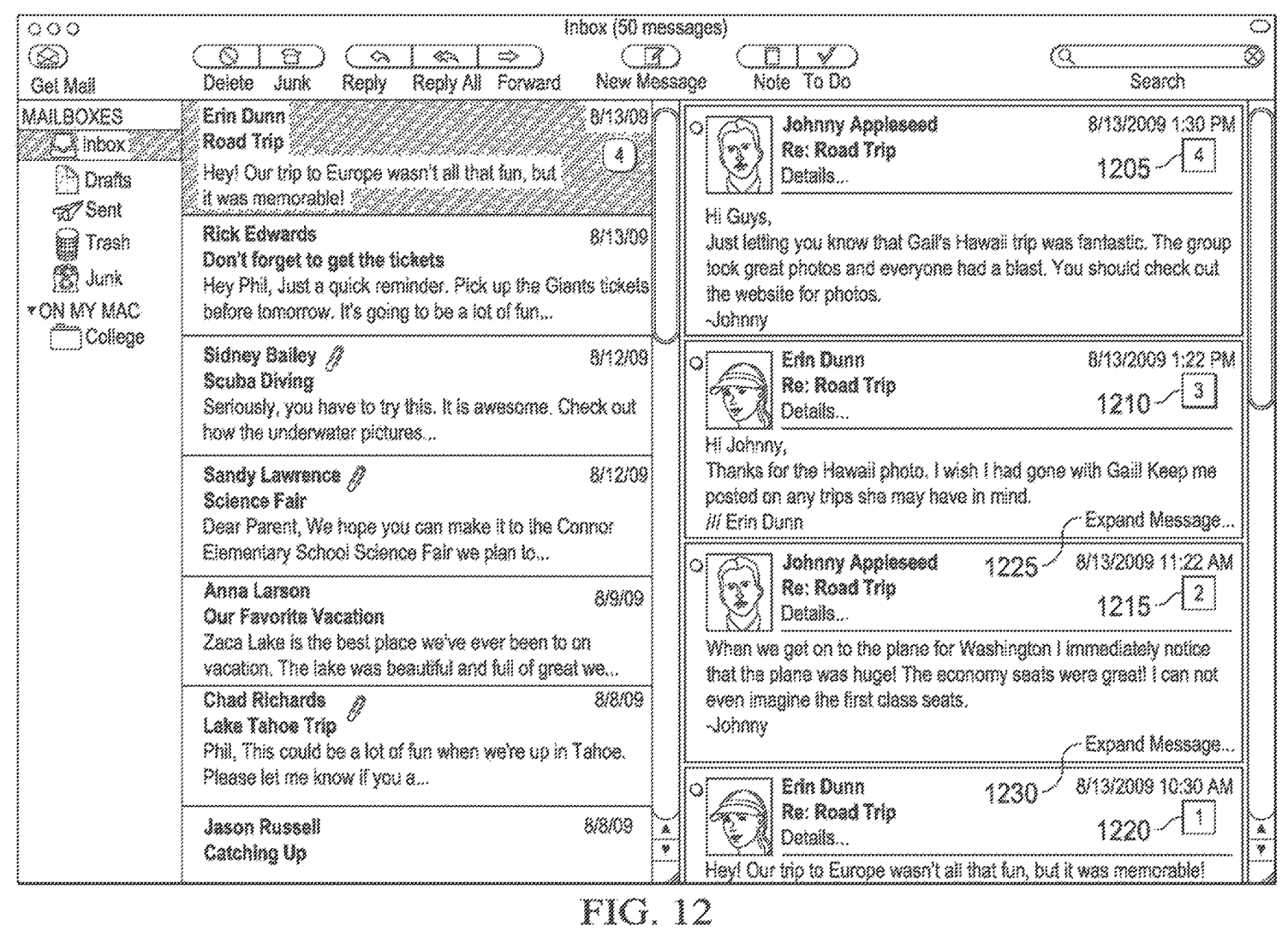

For one embodiment, the data processing system 100 provides the option to expand the message to show hidden text. For example, referring to FIG. 10, message 3 includes "See More from Johnny Appleseed" 1030 and message 2 includes "See More" 1035 in each quote as indicators of hidden redundant text. Referring to FIG. 12, messages 2 and 3 include "Expand Message . . . " 1225 and 1230 in the lower right corner of each message. For one embodiment, a different indicator of hidden text is used. For one embodiment a different location of the indicator is used. For one embodiment, the message is expanded in response to receiving an input from a user. For example, the input received to expand a message may include a mouse click on the indicator, a selection from a drop down menu, a selection made via "right-click" on the message, etc. For one embodiment, the expansion of each instance of hidden text is initiated separately.

Figure 13:
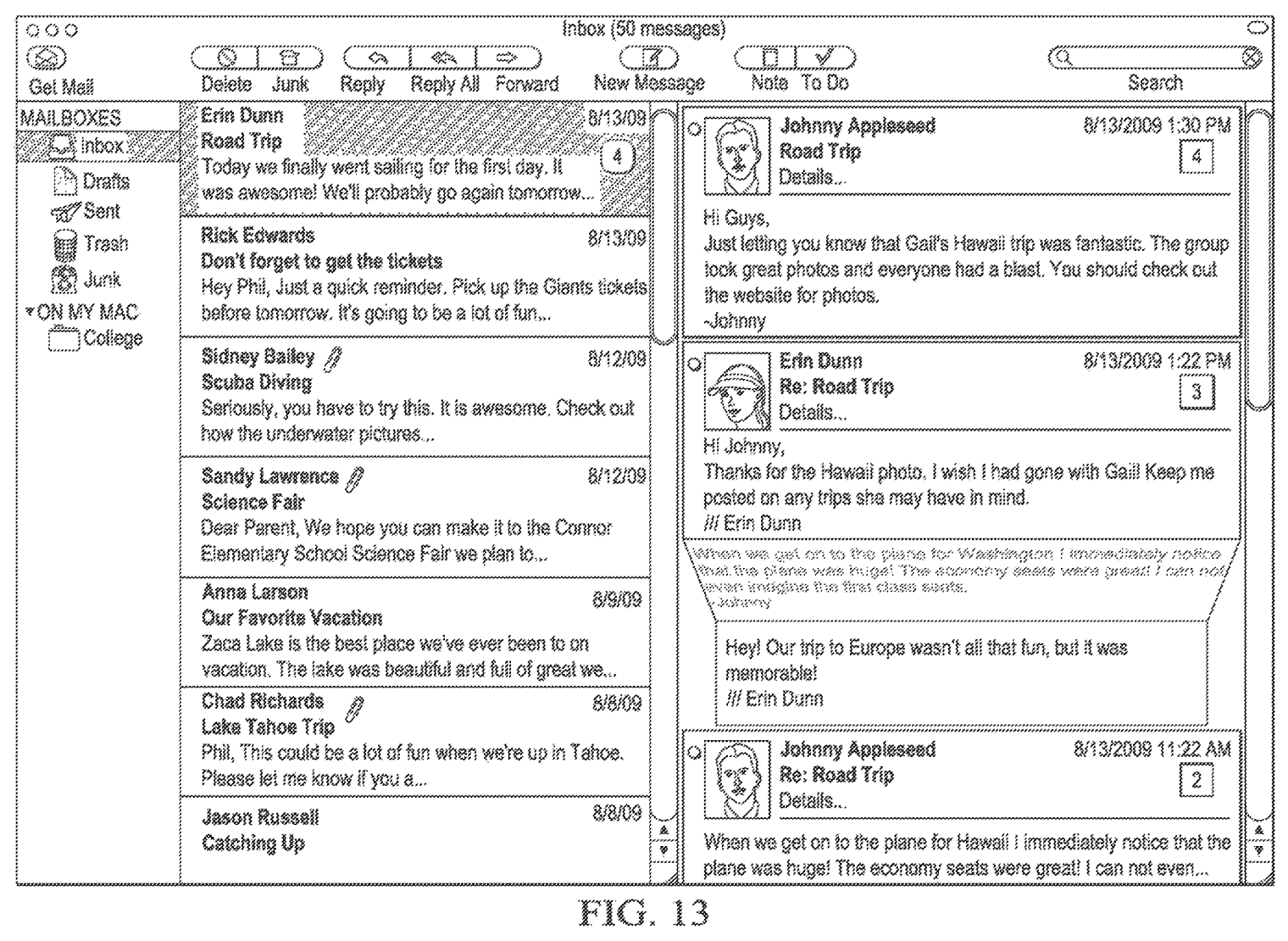

FIG. 13 illustrates the exemplary user interface of FIG. 12 in which a message is being expanded to show hidden text. For one embodiment, the expansion of the message has the appearance of a folded letter (e.g., an image of a message on a folded piece of paper) in which the hidden text was under the fold and, by unfolding the letter, the hidden text becomes visible. Alternatively, the message is expanded simply by increasing the length of the message. For one embodiment, as the message expands, any messages in the conversation that are displayed above or below the expanding message are moved or removed from view to accommodate the space needed for the expanded message. For example, for one embodiment, the expansion of message 3 results in messages 1 and 2 being pushed further down screen.

Figure 14:
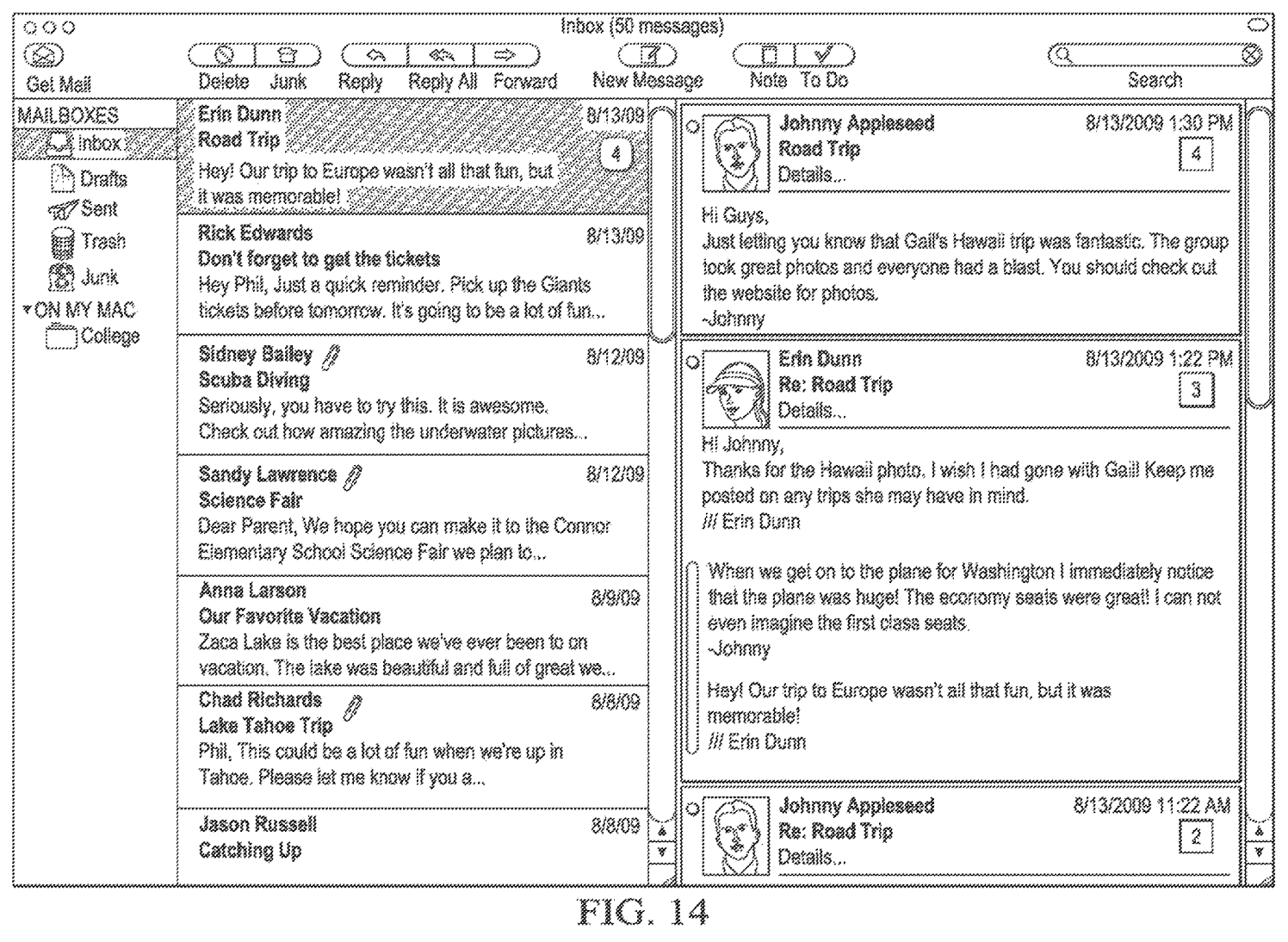

FIG. 14 illustrates the exemplary user interface of FIG. 12 in which a message has been expanded to show hidden text. For example, in the exemplary user interface, the redundant text of message 2 is now also visible in message 3.

For one embodiment, the displaying of the received message includes displaying a preview of the received message (e.g., in a preview pane as discussed above with reference to FIG. 4). For one embodiment, the preview includes at least a portion of non-redundant text (e.g., text that does not match the text of the original message). For an alternate embodiment, the preview only includes non-redundant text.

Figure 15:
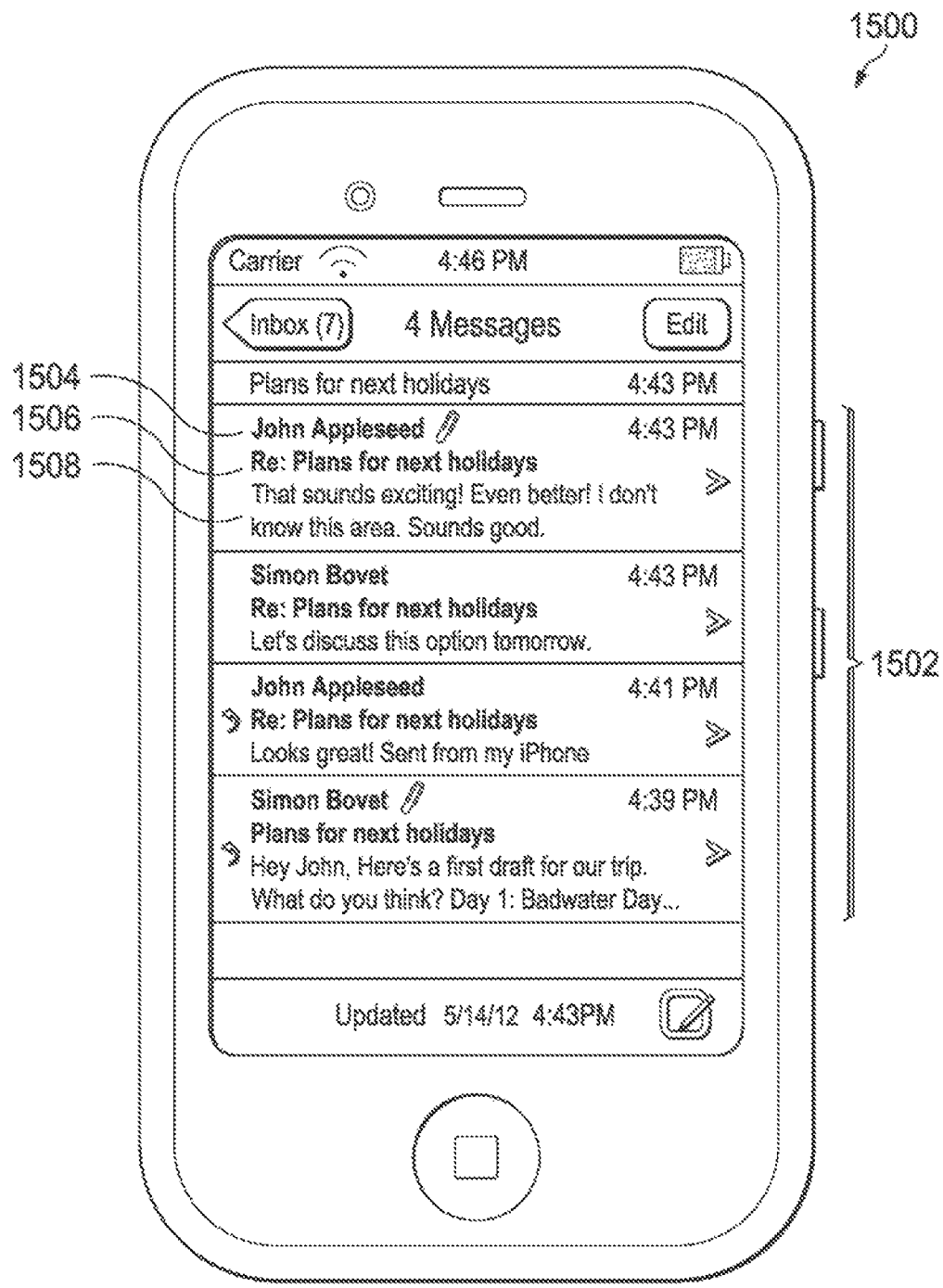
FIG. 15 illustrates a message preview screen that lists messages in a conversation according to an embodiment of the present invention

Some embodiments can be adapted for mobile devices (e.g., smartphones, other handheld devices, and/or tablet computers), which tend to have smaller display areas than desktop or laptop computers. Such devices can be implemented, e.g., as data processing system 100 of FIG. 1. FIG. 15 illustrates a message preview screen 1500 that lists messages in a conversation according to an embodiment of the present invention. In this example, preview screen 1500 shows a list with entries 1502 representing the messages in the conversation. For each message, the corresponding entry 1502 displays the sender 1504, subject line 1506, time 1508, and a preview portion 1510 (e.g., two lines) of the message content. In this example, preview portion 1510 includes only non-redundant text. In this configuration, the preview screen can occupy the entire display area. For larger devices, a message pane can be rendered in the display area, e.g., with the preview pane occupying a left portion of the display area and the message pane to the right of the preview pane. As described above, the message pane can display a single message or portions of multiple messages.

Figure 16:
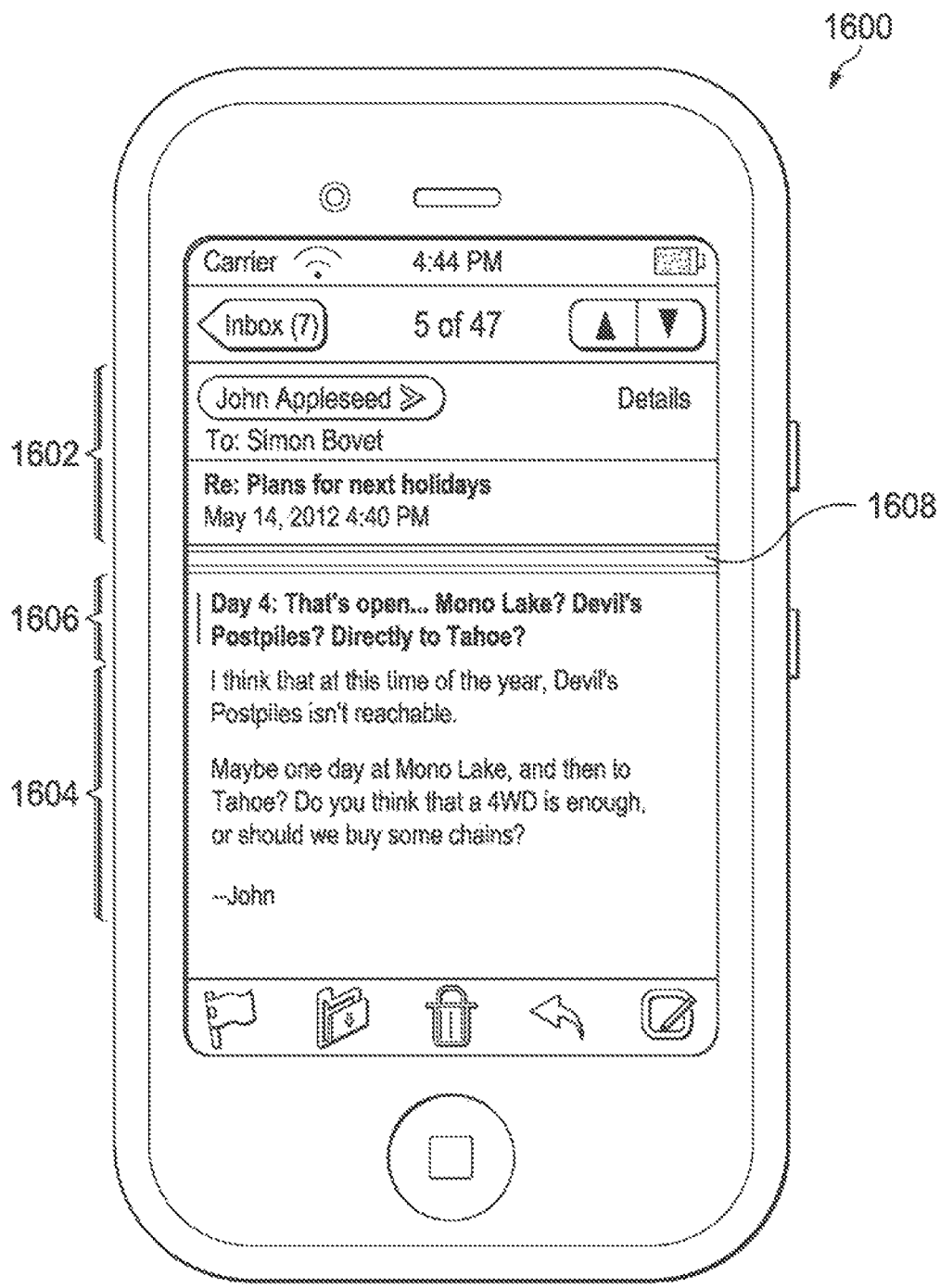
FIG. 16 illustrates a message display screen according to an embodiment of the present invention.

When the user selects a message, e.g., by touching the corresponding entry 1502, preview screen 1500 can be replaced by a message display screen (or on a larger device a message pane next to the preview pane can be updated to display the selected message). FIG. 16 illustrates a message display screen 1600 according to an embodiment of the present invention. Screen 1600 shows the selected message, with at least part of the redundant content (in this case, content quoted from an earlier message in the conversation) hidden. In this example, the sender and subject line are visible in top region 1602, and new text 1604 at the end of the message is visible. Quoted content preceding new text 1604 is largely hidden, with only a small portion appearing at 1606.

In this example, an expandable visual element 1608 is used to indicate the presence of hidden content. Visual element 1608 can have the appearance of an accordion fold in the rendering of the e-mail message (which resembles a sheet of paper). This indicator can be a cue to the user that hidden content is present. Visual element 1608 can occupy a small vertical portion of the screen, leaving room for the new content to be visible without the user needing to scroll down, even on a small display.

A user can access the hidden content by expanding the visual element. For example, if display screen 1600 is presented on a touchscreen, the user can expand the visual element by performing a suitable gesture. In some embodiments, the gesture can be a downward drag with one finger in contact with a portion of the message below indicator 1608 while the top of the message is at the top of the screen (or while the message is scrolled all the way to the beginning). For the user, this gesture can emulate pulling down on the paper to expand the accordion fold.

Figure 17A:
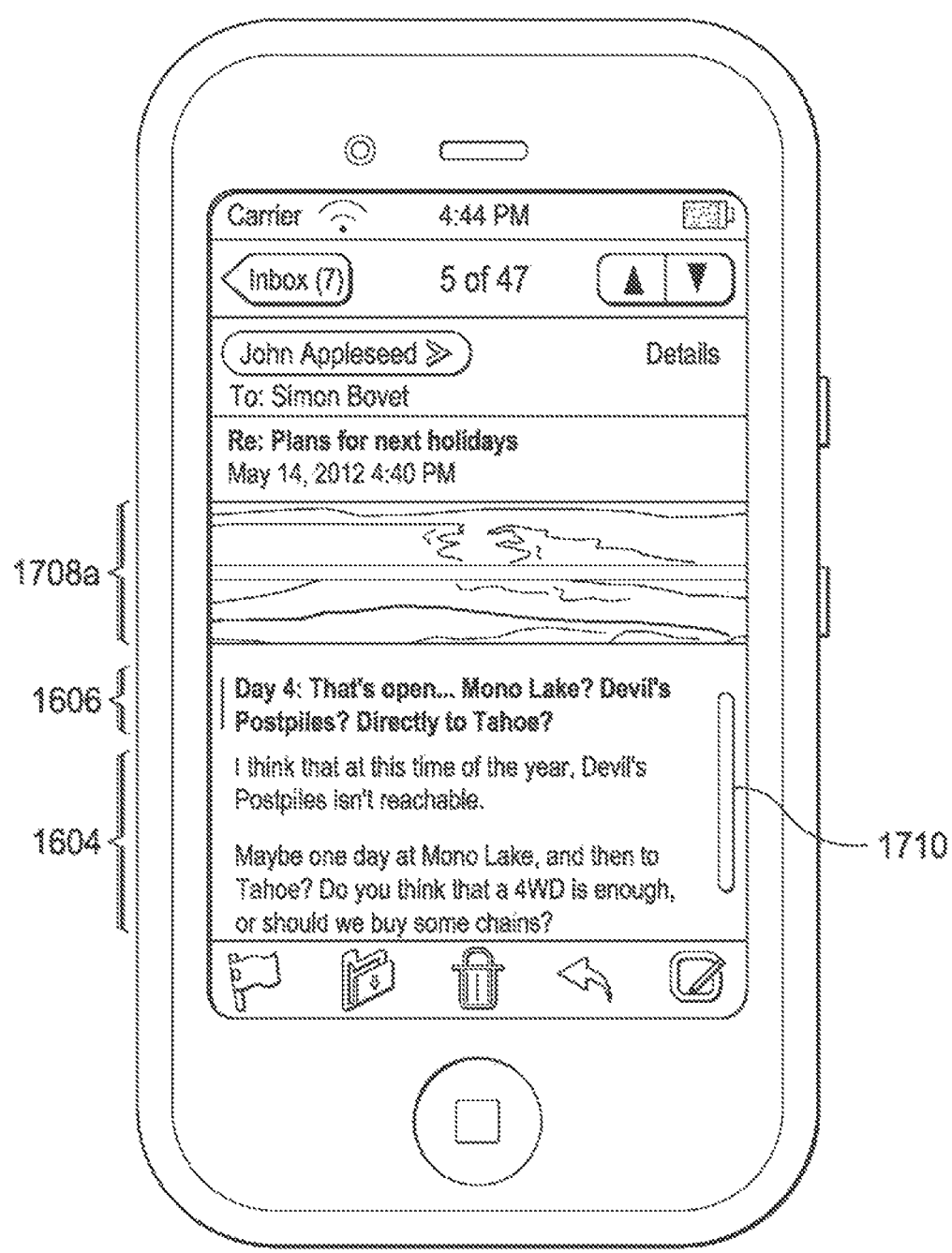
FIGS. 17A-17C illustrate an animated expansion of a visual element to reveal hidden content according to an embodiment of the present invention.
Figure 17B:
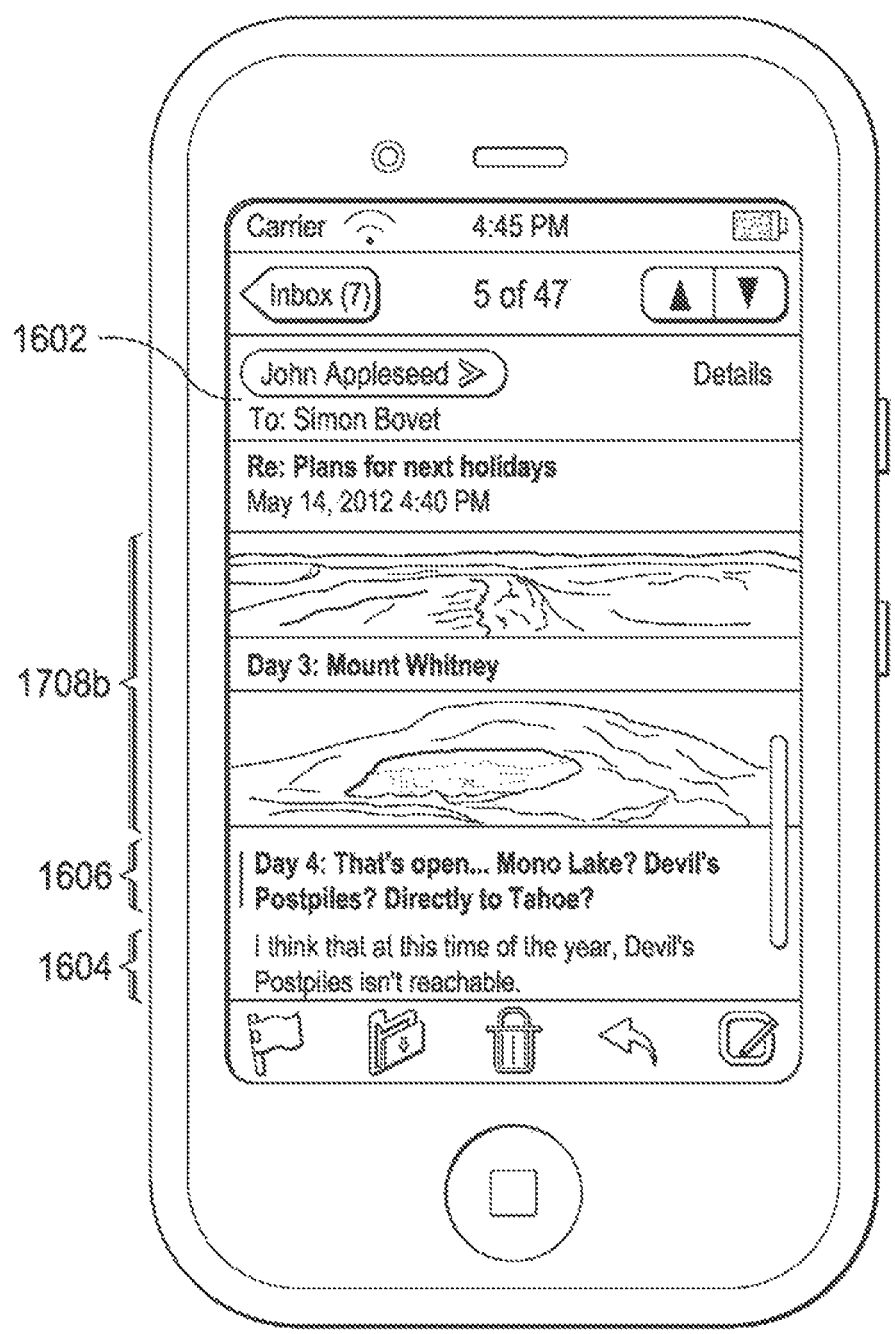
Figure 17C:
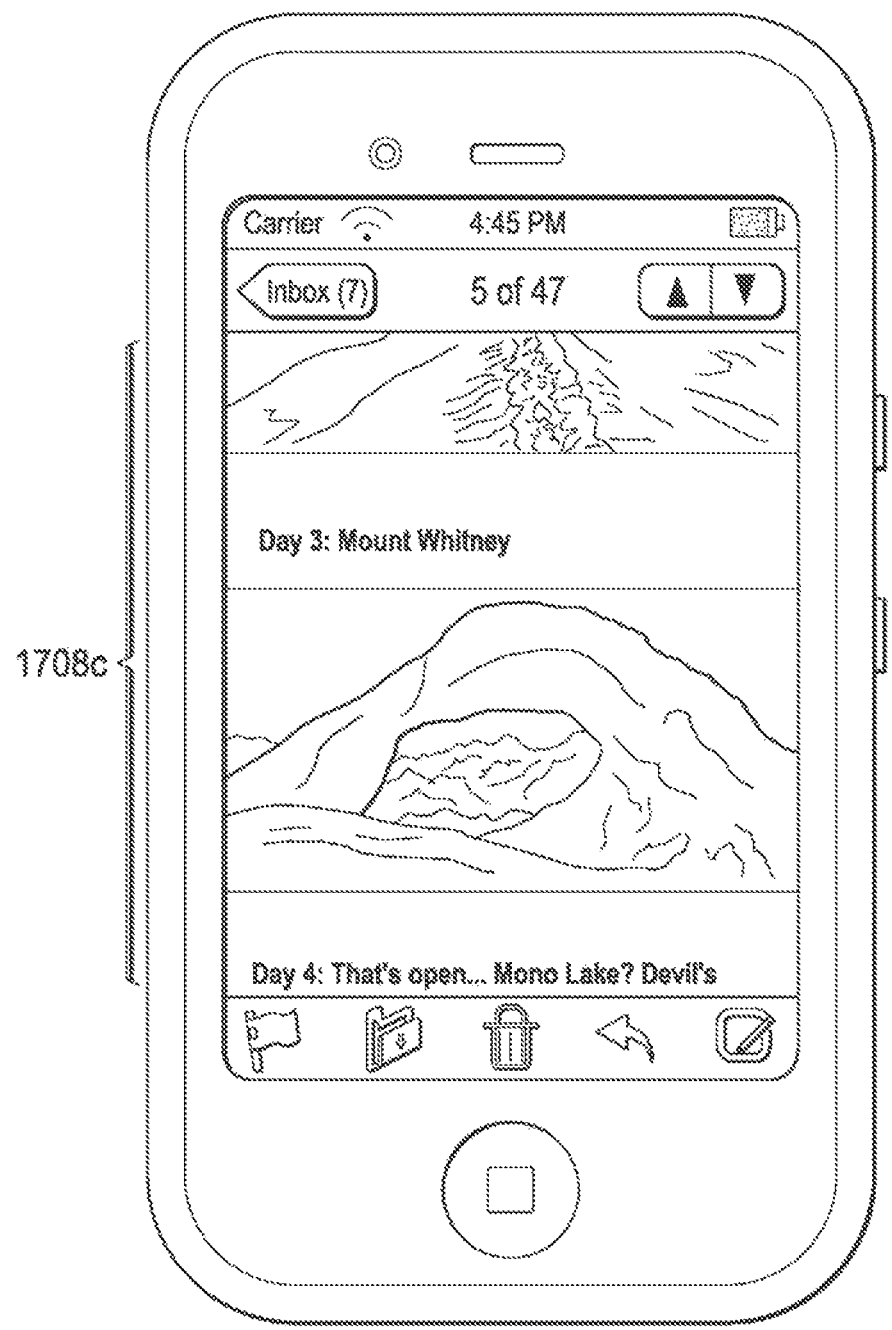

Expanding the visual element results in revealing the hidden content. This transition can be animated to correlate with the user's dragging gesture, as illustrated in FIGS. 17A-17C. Referring first to FIG. 17A, element 1708a represents an early stage in expansion of visual element 1608. The content is rendered at angles corresponding to the accordion folds of the virtual paper as the paper unfolds. The portion of the message below element 1708a, including quoted portion 1606 and new text 1604, moves down the screen to make space for expanding element 1708a. A scroll bar 1710 can be rendered if new text 1604 scrolls off the screen.

In FIG. 17B, visual element 1708b is further expanded, although not yet fully expanded. Again, the content is rendered at angles corresponding to the accordion folds of the virtual paper, but those angles are now closer to being in line with the rest of the message. In the example shown, the top portion 1602 of the message can begin to scroll off the top of the screen and the portion of the message below element 1708b can continue to scroll down, to make space for expanding element 1708b.

FIG. 17C illustrates the fully expanded state. In this example, fully expanded visual element 1708c occupies the entire message display area and scrolls off at top and bottom, revealing the previously hidden content. The user can scroll, e.g., using touch-based gestures, to view the entire message. As noted above, in some embodiments, a downward dragging gesture can be used to initiate the unfolding, and the expansion rate of element 1708a-c can be calibrated such that the fully-expanded state is reached when the user's finger reaches the bottom of the touchscreen area.

In some embodiments, the user can partially expand element 1708, e.g., by dragging a finger (or contact object, such as a stylus) partway down the touchscreen. If the contact is released before the finger reaches the bottom of the touchscreen, element 1708 can spring back to its initial folded state (shown in FIG. 16). Thus, the user can "peek" at hidden content without fully expanding it.

Fully expanded element 1708c might or might not be re-foldable, depending on design choice. For example, in some embodiments an icon can be rendered, e.g., at the top or bottom of the message area, to instruct the device to re-fold the message (or hide redundant content portions). In other embodiments, once the hidden content portion is fully expanded, it can remain expanded until the user navigates away from the message. If the message is subsequently re-displayed, e.g., because the user selects it again, the display can start in the folded configuration; alternatively, the device can keep track of which messages the user has previously unfolded and present each message in its last configuration each time the user selects it.

It should also be noted that while FIGS. 16 and 17A-17C are illustrated in the context of a display where only the message is visible, an expandable visual indicator to hide and reveal elements of a message can also be implemented in a message pane that occupies only part of a display (e.g., in message pane 425 of FIG. 6).

Figure 18:
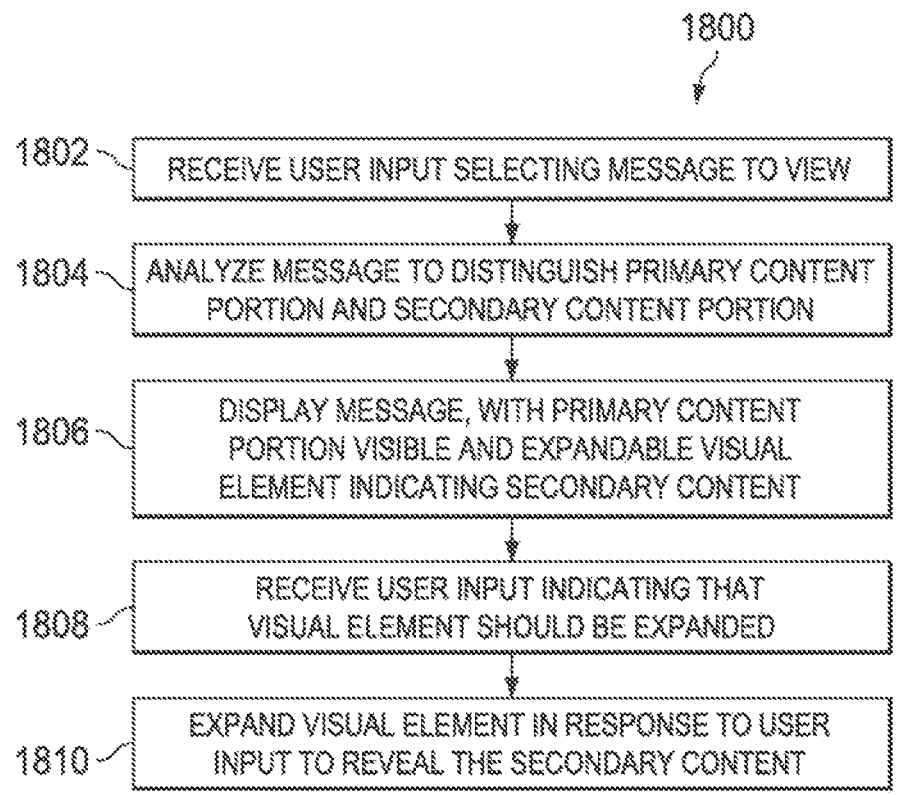
FIG. 18 is a flow diagram of a process for presenting a message according to an embodiment of the present invention.

An expandable visual element can be used to indicate various types of hidden content within a message, including but not limited to redundant text as described above. FIG. 18 is a flow diagram of a process 1800 for presenting a message according to an embodiment of the present invention. Process 1800 can be implemented in a variety of electronic devices capable of accessing messages and presenting messages to a user. Process 1800 can begin at block 1802, when the device receives user input selecting a message to be displayed.

At block 1804, the device can analyze the selected message to distinguish primary content and secondary content portions. As used herein, "primary content" can include any content that it is desirable to have visible to the user when the message is initially displayed, and "secondary content" can include any content that it is desirable to hide when the message is initially displayed. For example, in the case of an e-mail message that includes new text and redundant text (e.g., as described above), the new text can be primary content while the redundant text can be secondary content. The analysis can be done in real time (e.g., in response to receiving a request to display a particular message), or it can be done in advance (e.g., upon receipt of the message) and the results stored (e.g., as a markup to the message) for later use in displaying the message.

In some embodiments, processes described above (e.g., with reference to FIG. 11) can be used to parse a message into new text and redundant text. Other techniques can also be used. For example, many e-mail messages are communicated using HTML (hypertext markup language) format, and a standard tag such as <blockquote> is used to identify portions of a previous message that are being quoted in the current message. As another example, plain-text e-mail messages often use a special characters at the beginning of a line (e.g., ">") to indicate that the line contains quoted text. Accordingly, block 1804 can be used to search for portions of the message tagged with <blockquote>, special characters, or other indicia that a block of text or other content (e.g., inline images) is quoted from a previous message; one or more such portions can be identified as secondary content.

Other criteria can also be used for distinguishing primary and secondary content. For example, quoted content from a reply message may be preceded by an attribution line, such as "On May 31, John Appleseed wrote"; such lines can be detected and treated as secondary content along with the quoted text that follows. As another example, it may be desirable to initially hide inline images in the message, even if they are not redundant. As yet another example, boilerplate content, such as disclaimers that may be appended to the end of an e-mail message, can also be recognized (e.g., by comparing text across multiple e-mail messages from a particular sender) and treated as secondary content. Some embodiments may allow the user to set preferences for what is treated as secondary content when a message is displayed; thus, for example, the user might choose to hide content in a language she is unable to read.

In some instances, a message can be received as a forwarded message, and the sender who forwarded the message might or might not have added new content to the forwarded message. In some embodiments, forwarded messages can be treated as consisting entirely of primary content; in other embodiments, the forwarded portion can be identified and treated as secondary content.

Referring again to FIG. 18, at block 1806, the message can be displayed, with the primary content portion being visible and an expandable visual element being rendered to indicate the presence of the secondary content. The visual element can be positioned within the message at the point where the secondary content is located relative to the primary content. Thus, for example, in FIG. 16, the secondary content (in this instance quoted content) is above the primary content (in this instance new text), and visual indicator 1608 is rendered at the top of the message.

At block 1808, user input is received, indicating that the visual element should be expanded. This can be, for example, a dragging gesture as described above. At block 1810, in response to the user input, the visual element can be expanded to reveal the secondary content, e.g., as described above with reference to FIGS. 17A-17C.

Figure 19:
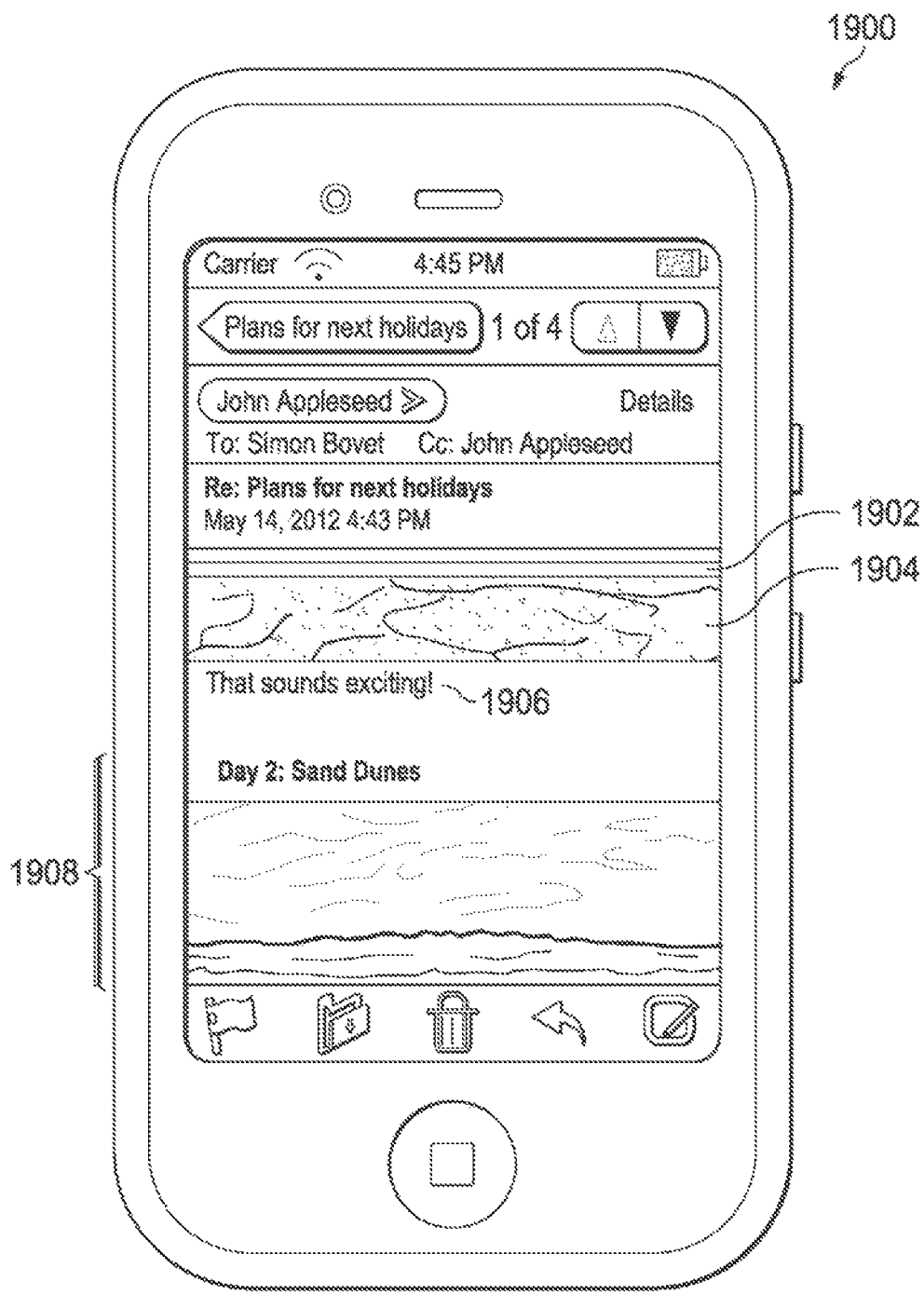
FIG. 19 illustrates an example of a screen displaying a message where quoted portions are interleaved with new text according to an embodiment of the present invention.

Quoted content can appear anywhere in a message. For example, a reply to an e-mail message can include quoted portions of the previous e-mail interleaved with comments from the person replying. In some embodiments of the present invention, only the first quoted portion is treated as secondary content. FIG. 19 illustrates an example of a screen 1900 displaying a message where quoted portions are interleaved with new text. In this example, visual element 1902 indicates hidden (secondary) content at the top of the message; similarly to FIG. 16, part of that content is visible at 1904. Below element 1904 is new text 1906. Below new text 1906 is additional quoted content 1908, which is not treated as secondary content. In this example, there would be at most one portion or block of secondary content in a particular displayed message, and the displayed message would include a single expandable visual element 1902.

Figure 20:
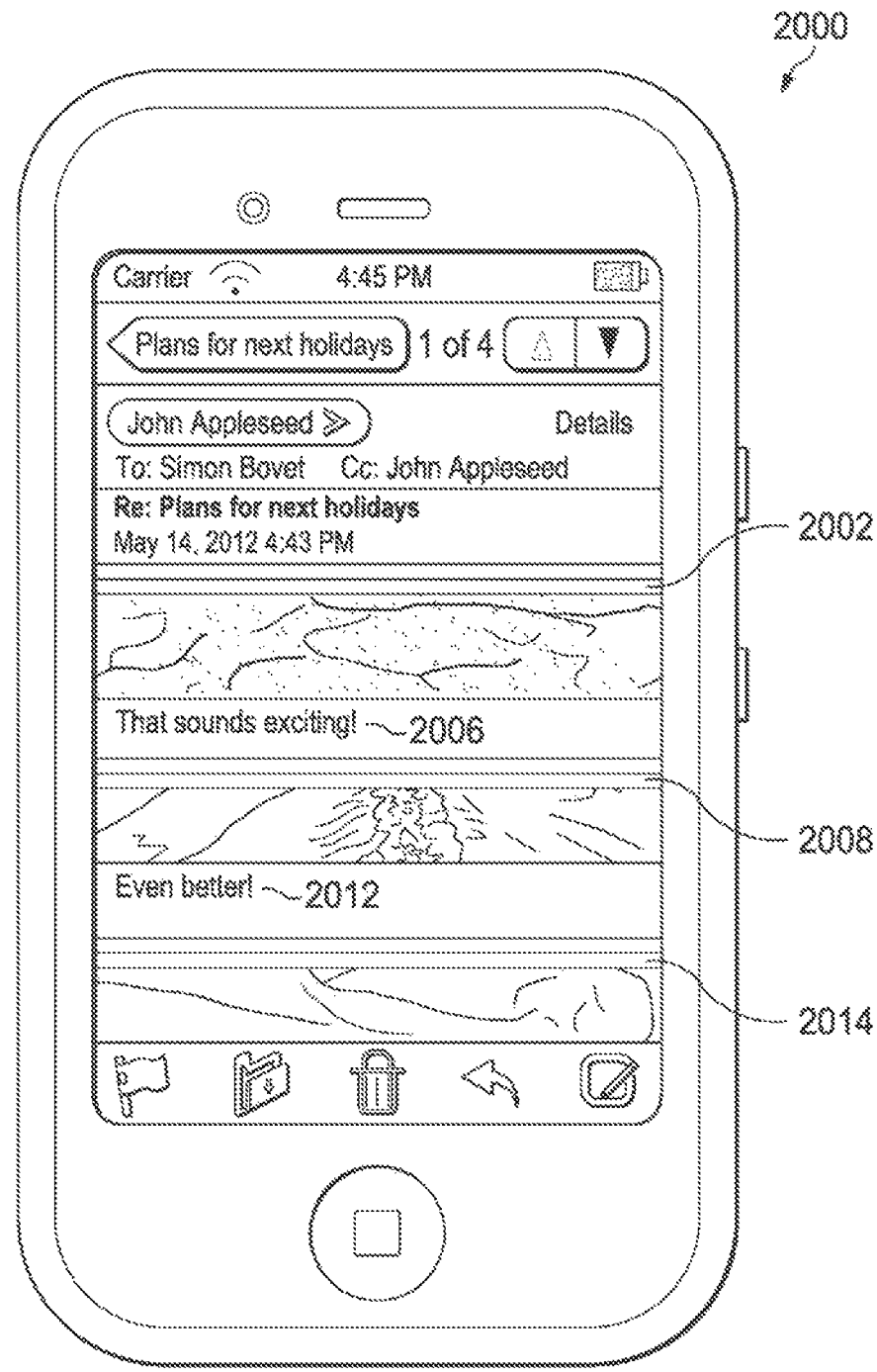
FIG. 20 illustrates an example of a screen displaying a message with multiple secondary content portions using multiple expandable visual elements according to an embodiment of the present invention.

Other embodiments, however, can provide multiple secondary-content sections interleaved with primary content, using multiple expandable visual elements. FIG. 20 illustrates an example of a screen 2000 displaying a message with multiple secondary content portions using multiple expandable visual elements. In this example, as in FIG. 19, the message includes quoted portions interleaved with new text, but in this instance, all quoted portions are treated as secondary content. Accordingly, a first expandable visual element 2002 indicates hidden (secondary) content at the top of the message. New text 2006 is treated as primary content and is visible. A second expandable visual element 2008 indicates the next portion of hidden (secondary) content, below which new text 2012 is visible as primary content. A third expandable visual element 2014 indicates a third portion of hidden (secondary content), and so on.

In some embodiments, the downward dragging gesture described above, performed when the top of the message is visible, results in expanding all expandable visual elements 2002, 2008, 2014 simultaneously. In some embodiments, other gestures can be defined to allow selective expansion of one or another of visual elements 2002, 2006, 2014. For example, the user can rest a first finger (or other contact object) on one of the expandable visual elements (e.g., element 2002) and drag a second finger (or other contact object) up or down to indicate that the particular visual element on which the first finger is resting should be expanded. As another example, an outward pinching gesture can be defined, in which the user places two fingers (or other contact objects) on the screen and moves them away from each other; performing this gesture with one finger on either side of a particular expandable visual element can be interpreted as indicating that the element between the fingers should be expanded. As still another example, the user can tap or double-tap on a particular visual indicator to expand it.

Some embodiments can also incorporate smart scrolling to help a user find the portions of the message likely to be of interest. In general, a scrolling operation involves moving rendered content across a display, and "smart scrolling" refers to slowing or stopping this movement at a "sticky" point before the beginning or end of the content is reached. The sticky point(s) can be selected based on various criteria.

One criterion can be based on the assumption that a user is most likely to want to see new content. Thus, when a message where new content is interleaved with quoted content (e.g., as in FIGS. 19 and 20) and when the message is displayed with the quoted content expanded, a smart scrolling operation can define each block of new content as a sticky point. The user can quickly scroll, and the operation will automatically stop when the next block of new content appears at a particular point on the screen (e.g., at the top or a quarter of the way down), allowing the user to jump quickly to each block of new content.

Another criterion can be applied in the case of "nested" reply messages. Many e-mail clients generate a reply message by inserting the content of the message being replied to into the reply message and placing a cursor either above or below this content. When a series of replies takes place (e.g., as described above with reference to FIGS. 3A-3D), the most recent message can include several levels of nested or chained replies. The beginning of each message in the chain can be defined as a sticky point for a smart scrolling operation, allowing the user to move quickly to the next (or next oldest, depending on direction) message in the chain.

As another example, some messages can be in the form of digests that contain multiple messages that may come from different senders and may have different subjects. Such digests can be generated, e.g., by content aggregators or in the context of e-mail-based discussion groups. Where a received message is determined to be a digest containing multiple messages, the beginning of each such message can be defined as a sticky point for a smart scrolling operation, allowing the user to navigate easily from one message to the next.

It will be appreciated that variations and modifications are possible. For example, the expandable visual element is shown as resembling an accordion fold, and the fold can have any number of pleats. In some embodiments, the same number of pleats is always used; in other embodiments, number of pleats can be suggestive of the amount of secondary content that is hidden in the fold. In other embodiments, other expandable visual elements can be used. For example, the element could appear to be initially rolled up and to unroll as it expands.

Various gestures or other user inputs can be defined to control the expansion of an expandable visual element. Other gestures can also be defined, e.g., to scroll the message down or up. For example, an upward dragging gesture can be used to scroll down (advancing the displayed portion toward the end of the message), and a downward dragging gesture can be used to scroll up. As described above, the same downward dragging gesture, if performed when the top of the message is visible, can be interpreted as a user intent to expand the message (since when the top of the message is visible, there is no further content that can be displayed by scrolling up). In some embodiments, as long as the message is not at the top, any downward drag (regardless of speed or distance traversed) is interpreted as scrolling; only when the top is reached would a further downward drag be interpreted as expanding an expandable visual element. Other techniques can also be used to distinguish expansion input from scrolling or other input (e.g., zooming).

In addition to the expandable visual indicators, some embodiments can also provide additional optimizations in message display to accommodate limitations on screen size and/or improve readability.

Figure 21A:
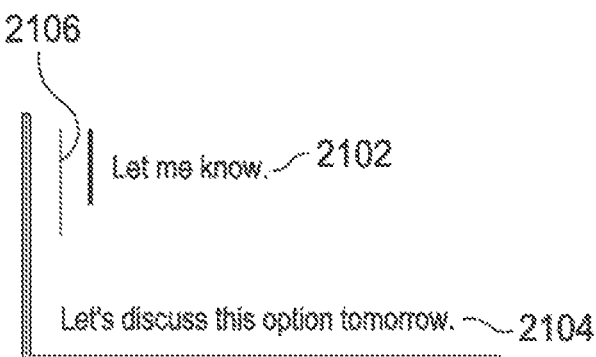
FIGS. 21A and 21B illustrate elimination of trailing blank lines in a block of quoted text according to an embodiment of the present invention.

For example, FIG. 21A illustrates a portion of a displayed message where an end portion of block-quoted text is visible at 2102 and new text is visible at 2104. The quoted text can be marked as quotation, e.g., using bars 2106, and multiple bars can be used to distinguish quoted text within quoted text. Bars 2106 can be generated based on the message properties, which can include any number of trailing blank lines; consequently, as shown, bars 2106 may extend for some number of lines below the end of information-containing quoted text 2102.

Figure 21B:
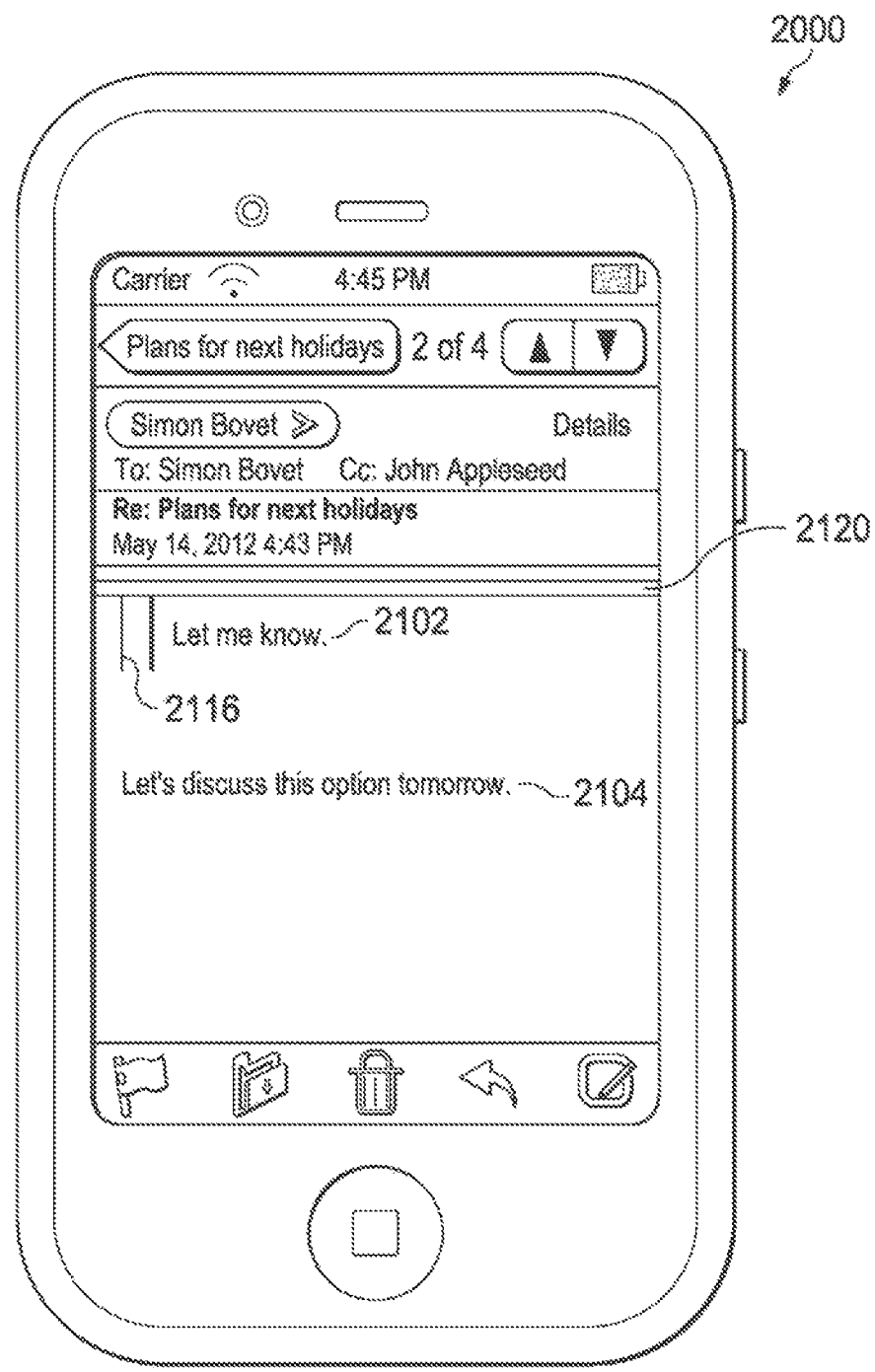

In some embodiments of the present invention, this extra space can be eliminated, e.g., by not rendering the trailing blank lines. FIG. 21B illustrates a message display screen 2110 displaying a portion of the same message as in FIG. 21A. Here, however, bars 2116 are truncated at the last line of text 2102; trailing blank lines are ignored. This can reduce the amount of internal blank space in a displayed message and consequently the amount of scrolling required to read the whole message. In the example shown in FIG. 21B, much of the quoted text is hidden using expandable visual indicator 2120, which can be implemented as described above, to further provide for convenient reading of the message with reduced need for scrolling.

Figure 22:
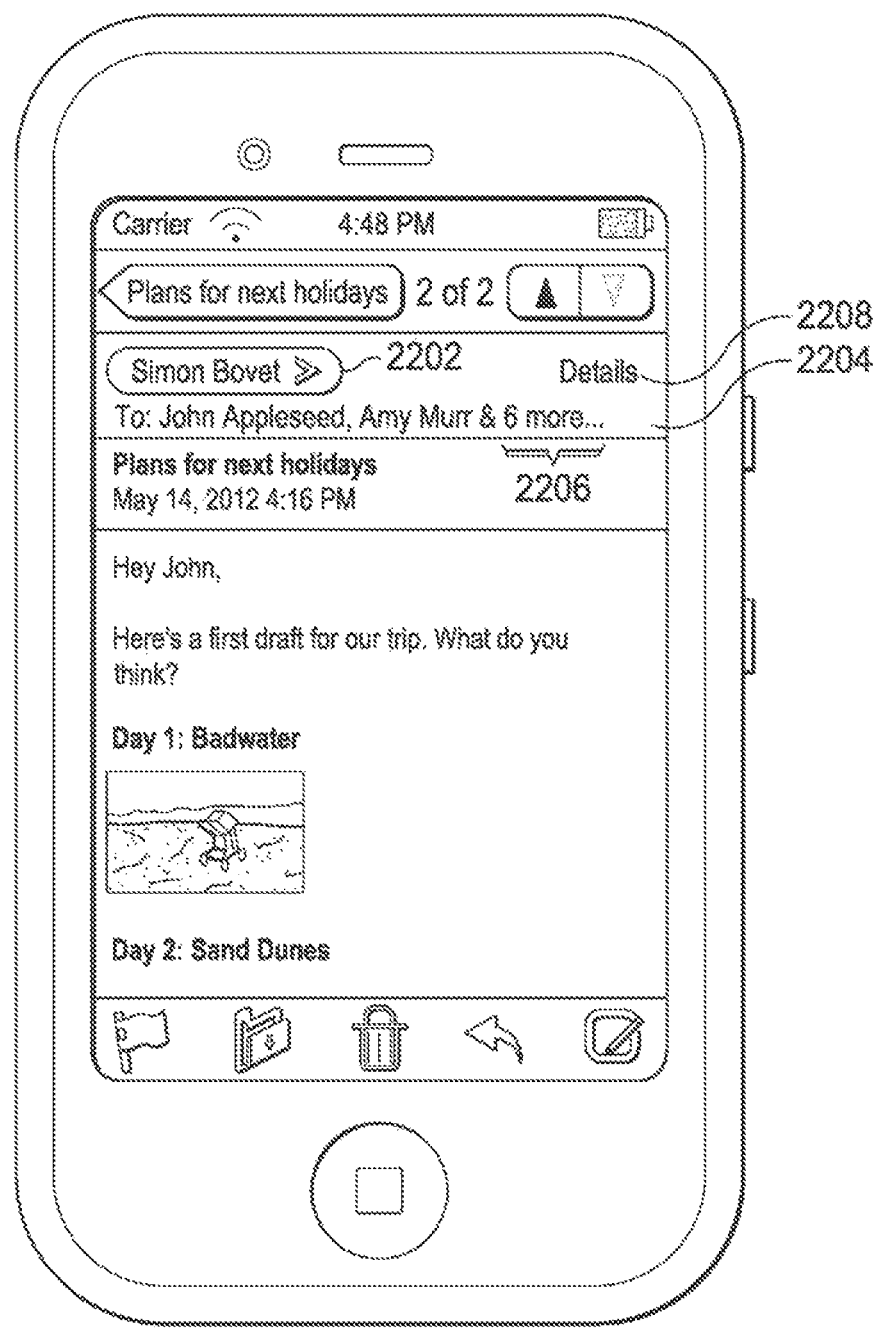
FIG. 22 illustrates a portion of a displayed message with condensed header information according to an embodiment of the present invention.

As another example of optimizing message display to increase the amount of space available for content, FIG. 22 illustrates a portion of a displayed message with condensed header information, reducing the portion of the display area occupied by message headers as opposed to content. The sender is identified at line 2202. At line 2204, a truncated recipient list is shown. The list can be truncated to fit in a specified amount of space, e.g., a single line of text or two lines of text, and can include fewer than all of the recipients of the message. An indicator 2206 can be provided to show that the list is incomplete.

Selection of which names to show in the truncated recipient list can be based on various criteria. For example, if the user whose device is displaying the message was included as a recipient in the "TO" list, the user's name can be the first one listed; if the user received the message as a "CC," then the user's name can be omitted in the truncated list. Or, the user's name can always be listed and flagged as either "TO" or "CC," with other recipient names being shown as space permits. Selection of other recipients' names to be displayed in the truncated list can be based on various criteria. For example, "TO" recipients may be preferred over "CC" recipients. Other criteria can include, for example, whether a particular recipient is in the viewing user's contacts list, which recipients most recently or most frequently participated in a conversation of which the message is a part, which recipients have had the most frequent and/or most recent contacts with the user, random selection, order in which recipients are listed in the "TO" and/or "CC" lists of the message, etc.

Figure 23:
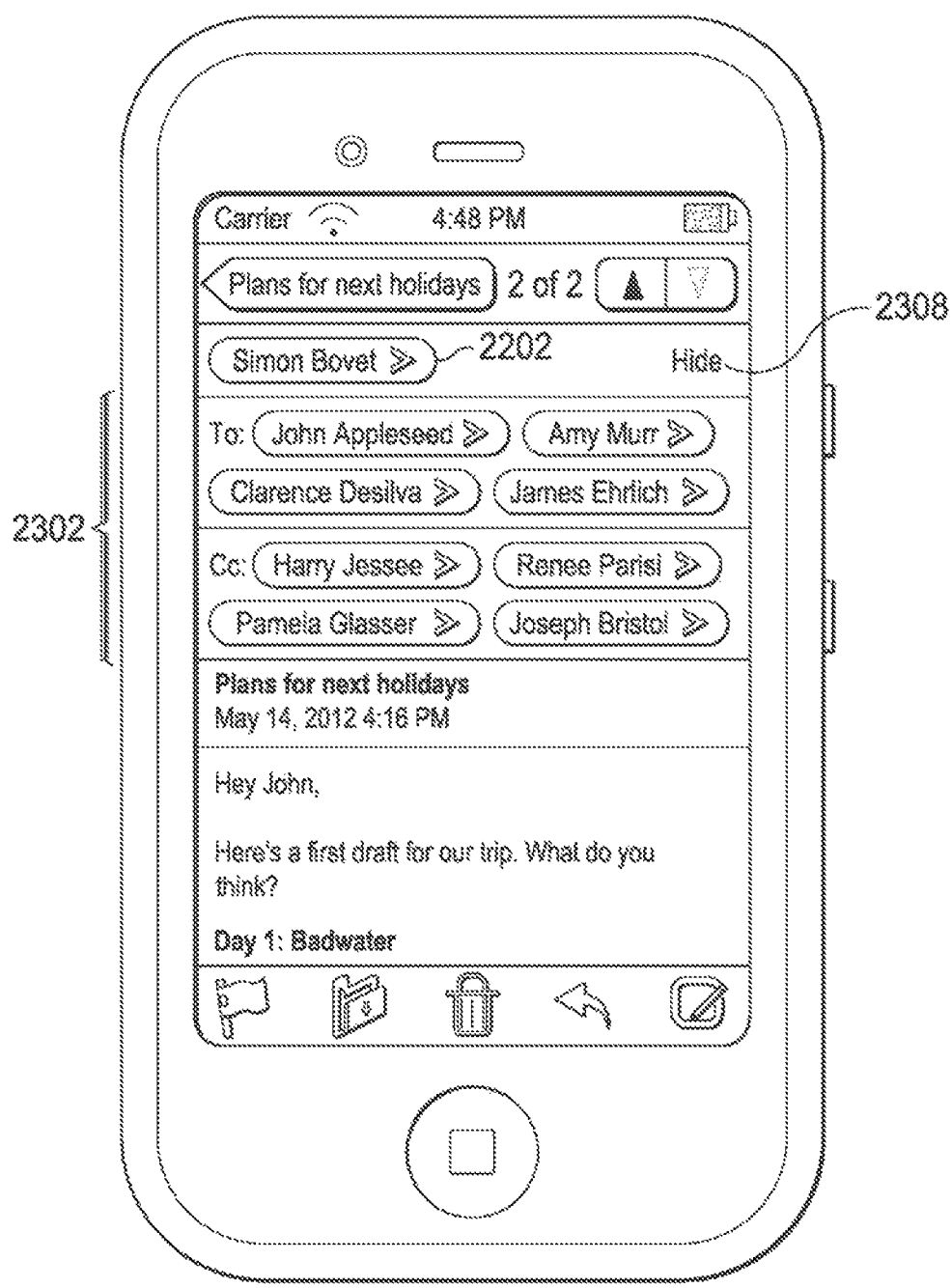
FIG. 23 illustrates the same message as FIG. 22 with expanded header information according to an embodiment of the present invention.

A selectable "Details" icon 2208 can be touched by the user to reveal the complete recipient list. FIG. 23 shows the same message as FIG. 22, with the header expanded to include a complete recipient list at 2302. Selectable "Hide" icon 2308 can be touched by the user to revert to the truncated recipient list of FIG. 22.

In this example, in the condensed-header view (FIG. 22), the sender's name at 2202 is provided as a touchable icon that the user can touch, e.g., to create or access a contact record for the sender, while the recipient names at line 2204 are presented as plain text. In the expanded-header view (FIG. 23), each recipient name in area 2302 is also presented as a touchable icon. As can be seen, a significant saving of space can be achieved, depending in part on the number of recipients to whom a particular message was sent.

Another optimization relates to the presentation of graphical content included along with text in a message. When presenting messages on a display screen, it can be convenient to wrap text lines based on the width of the display area. Graphical content, such as images, tables, or the like, cannot be wrapped in the manner of text without obscuring the information contained therein. Accordingly, when presenting graphical content, it is common to scale the size of the displayed message so that the width of the graphical content item does not exceed the width of the display area.

Figure 24A:
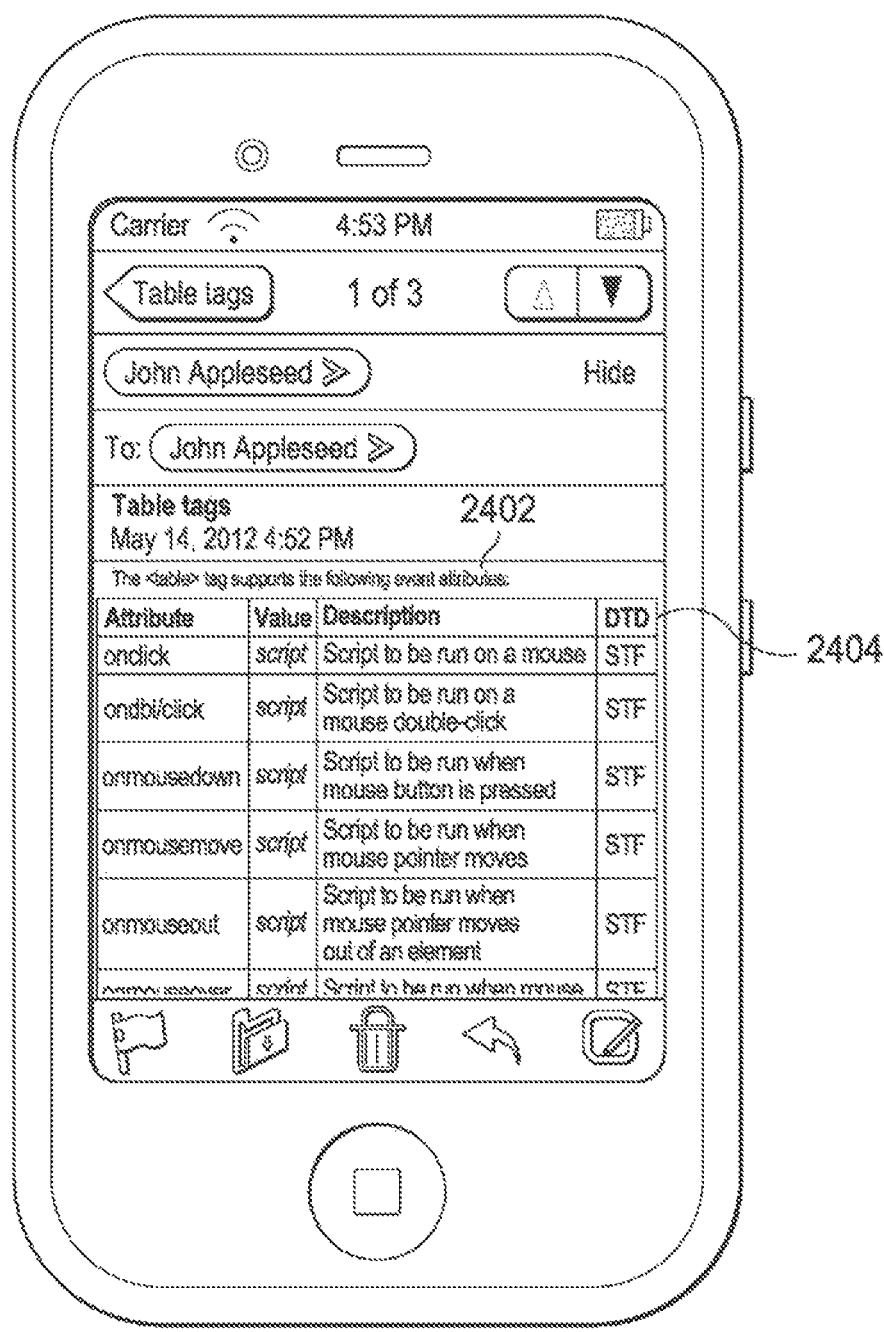
FIGS. 24A and 24B illustrate displayed messages containing both text and graphical content elements.
Figure 24B:
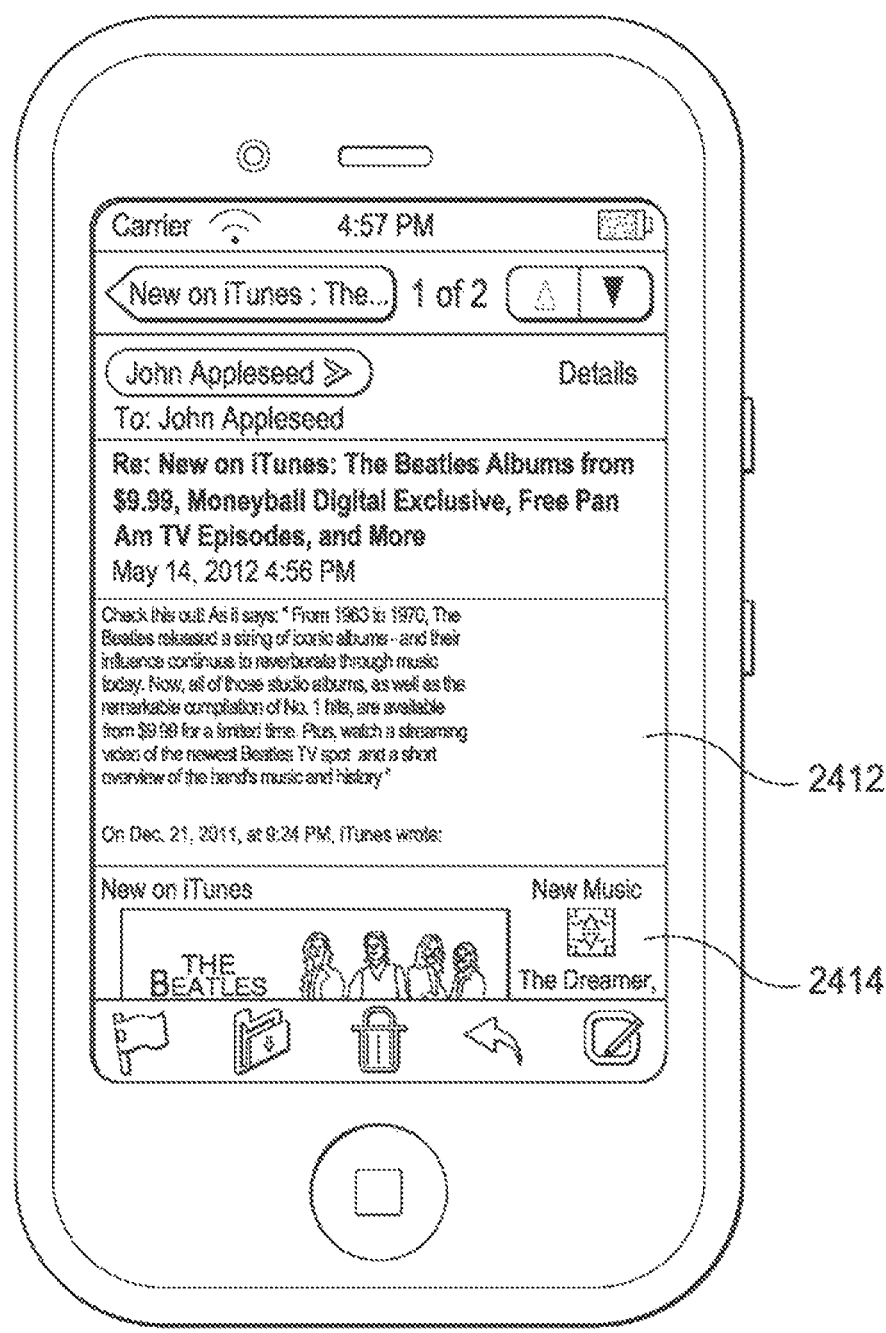

If the text size is scaled along with the graphical content, this can have unfortunate consequence for readability, as illustrated in FIGS. 24A and 24B. FIG. 24A illustrates a portion of a displayed message that includes both text 2402 and graphical content, in this case table 2404. The message has been scaled such that table 2404 fits within the width of the display area, but text 2402 is small and may be difficult to read. Similarly, FIG. 24B illustrates a portion of a displayed message that includes text 2412 and graphical content, in this case image 2414. The message has been scaled such that image 2414 fits within the width of the display area, but text 2412 is small and may be difficult to read. While it is possible to read the text by enlarging the displayed message (e.g., by zooming in), enlarging also results in the message being wider than the display so that scrolling from side to side is generally necessary to read the text.

Figure 25A:
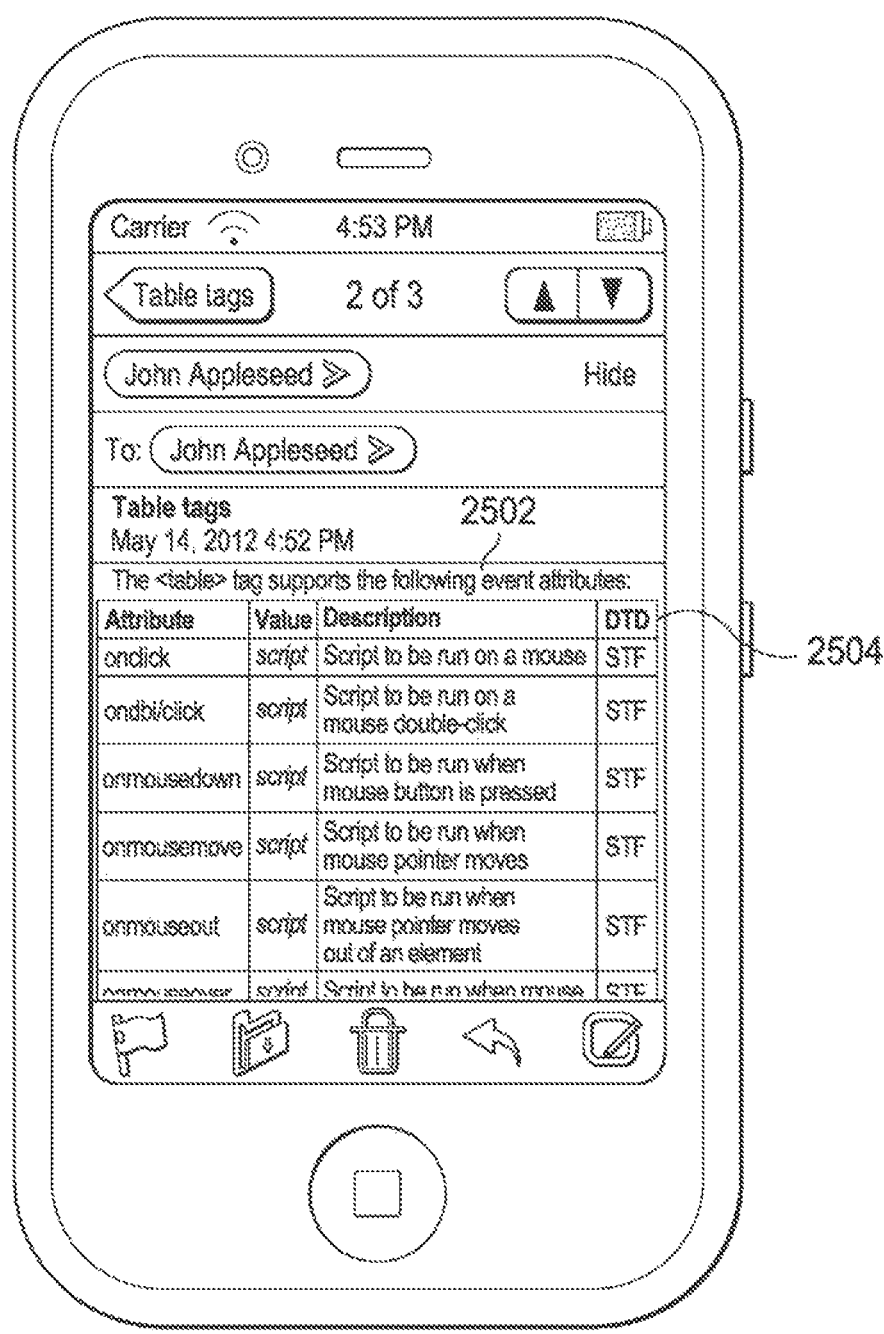
FIGS. 25A and 25B illustrate the effect of independently scaling different portions of the messages of FIGS. 24A and 24B, respectively, according to an embodiment of the present invention.
Figure 25B:
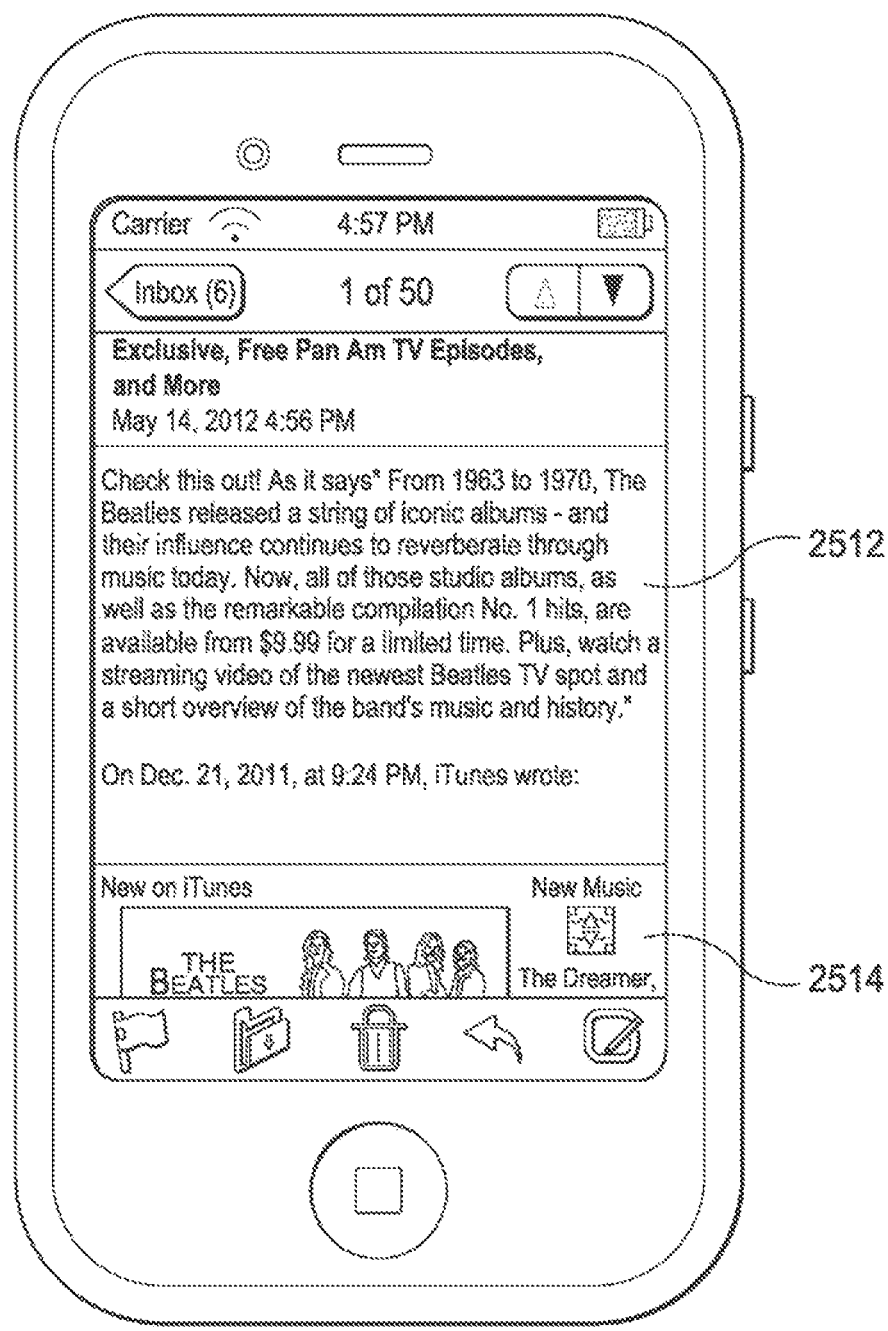

The need for zooming can be reduced or in some instances avoided by scaling the text and graphical content elements of a message independently of each other. FIGS. 25A and 25B illustrate an effect of independently scaling different displayed portions of a message according to an embodiment of the present invention.

FIGS. 25A and 25B illustrate portions of the same messages as shown in FIGS. 24A and 24B, respectively. In FIGS. 25A and 25B, different scale factors have been applied to the text and graphical elements. For example, text can be rendered at a default text size (which can be set by user preference) and wrapped to fit the width of the message display area, while graphical elements can be scaled as needed to fit within the width of the message display area. Consequently, text portions 2502 and 2512 are larger and more readable than text portions 2402 and 2412, while graphical elements such as table 2504 and image 2512 still fit within the screen width.

Figure 26:
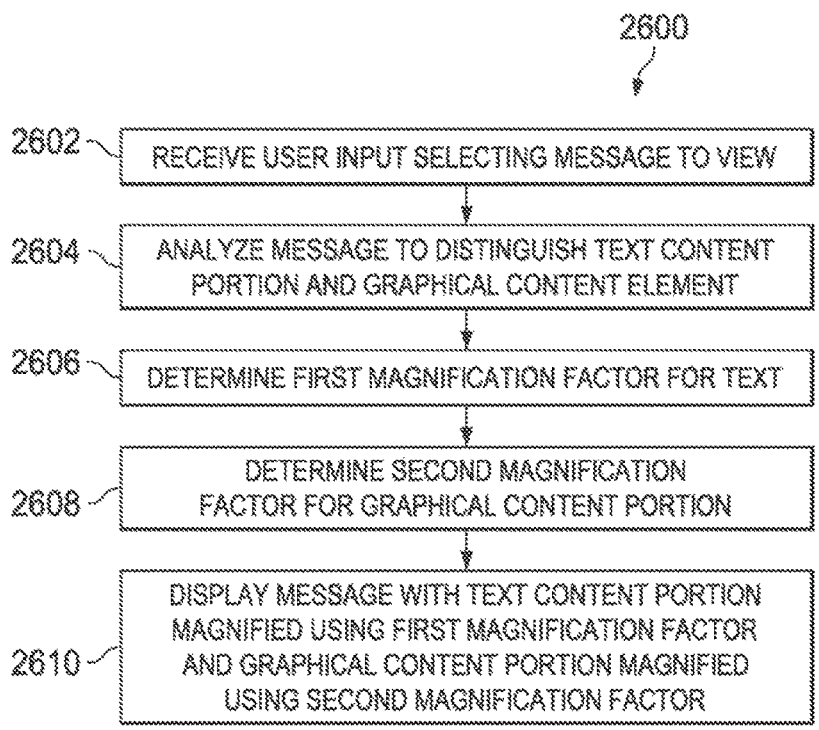
FIG. 26 is a flow diagram of a process for rendering messages with selective magnification according to an embodiment of the present invention

FIG. 26 is a flow diagram of a process 2600 for rendering messages with selective magnification according to an embodiment of the present invention. Process 2600 can be implemented in a variety of electronic devices capable of accessing messages and presenting messages to a user. Process 2600 begins at block 2602, when the device receives user input selecting a message to be displayed.

At block 2604, the message can be analyzed to distinguish text content portions and graphical content elements. The analysis can rely on tags in the message (e.g., a <table> tag for an HTML table, image tags for images, etc.); untagged content can be treated as text. The analysis can also identify inline images as graphical content elements. The analysis can also detect separators between parts of a multi-part message and treat each part as a different portion (either text or graphical content, depending on the particular content of the message).

At block 2606, a first magnification factor, to be used for rendering text portions, can be determined. For example, the first magnification factor can be set as a user preference. At block 2608, a second magnification factor, to be used for rendering a graphical content element, can be determined. For example, the second magnification factor can be determined based on the width of the message display area relative to the actual width of the graphical element, e.g., choosing a magnification factor that will result in the graphical element filling, or nearly filling, the width of the display area. Each magnification factor can be determined independently of the other, and the determination can be based on different considerations, e.g., readability in the case of text, fitting the width of the display area in the case of graphical content.

At block 2610, the message can be displayed. Text can be rendered using the first magnification factor and wrapped to fit the width of the display area. A graphical content element can be rendered using the second magnification factor. As a result, a user can view the message without side-to-side scrolling and without needing to enlarge the message to read the text. The user can still choose to enlarge the displayed message, e.g., in order to view details of the graphical content element; however, the user can view the message as a whole and read its text without needing to zoom or to use side-to-side scrolling.

In some instances, a message can include multiple graphical elements. Some embodiments support independent determination of a magnification factor for each graphical element, e.g., so that each such element is can be displayed at or near the largest size that does not exceed the screen width. In other embodiments, all graphical elements in a message are displayed with the same magnification factor, which can be selected, e.g., based on the width of the widest graphical element, so that no graphical element extends beyond the width of the display area. In any case, the magnification factor(s) for graphical elements can be selected independently for each message, based on the particular graphical element(s) in that message, and this selection can be made and independently of the magnification factor used for text.

In embodiments where messages are displayed using expandable visual elements that initially hide secondary content, different portions of the message content can be magnified differently, e.g., using process 2600 or similar processes. The distinguishing of primary and secondary content portions for purposes of determining what to hide can be done independently of distinguishing text from graphics for purposes of determining magnification factors. The message can be initially displayed with primary content (which can include text or graphics) rendered using the magnification factor(s) assigned thereto and secondary content hidden using an expandable visual element as described above. As the visual element is expanded to reveal the secondary content, that content (which can also include text and/or graphics) can be rendered using the magnification factor(s) assigned thereto.

In the foregoing specification, the invention has been described with reference to specific exemplary embodiments thereof. It will be evident that various modifications may be made thereto without departing from the broader spirit and scope of the invention as set forth in the following claims. An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

What is claimed is:

1. A non-transitory computer-readable storage medium including instructions executable by one or more processors of an electronic device with a display, the instructions for:
   concurrently displaying, on the display, a first pane and a second pane, wherein the first pane includes a plurality of items including a first item that represents a first plurality of messages and a second item that represents a second plurality of messages;
   detecting selection of the first item of the plurality of items;
   in response to detecting selection of the first item, displaying representations of two or more of the first plurality of messages represented by the first item in the second pane while maintaining display of the plurality of items in the first pane;
   detecting a user input associated with the first item of the plurality of items in the first pane;
   in response to detecting the user input associated with the first item of the plurality of items, displaying a plurality of sub-items in the first pane, the plurality of sub-items corresponding to a respective set of one or more messages of the first item;
   while concurrently displaying the plurality of items in the first pane and the representations of the two or more of the first plurality of messages represented by the first item in the second pane, detecting selection of the second item of the plurality of items; and
   in response to detecting selection of the second item, replacing display of the representations of the two or more of the first plurality of messages represented by the first item with display of representations of two or more of the second plurality of messages represented by the second item while maintaining display of the plurality of items in the first pane.

2. The non-transitory computer-readable storage medium of claim 1, wherein the plurality of items further includes a third item that represents a single message, further including instructions for:
   in response to detecting selection of the third item displaying a representation of the single message represented by the third item in the second pane while maintaining display of the plurality of items in the first pane.

3. The non-transitory computer-readable storage medium of claim 2, wherein:
   the representation of the single message extends an entire width of the second pane, and the representations of the two or more of the first plurality of messages and the representations of the two or more of the second plurality of messages extend less than the entire width of the second pane.

4. The non-transitory computer-readable storage medium of claim 1, wherein a sub-item of the plurality of sub-items includes a preview item indicating a sender or a date of a respective message.

5. The non-transitory computer-readable storage medium of claim 1, wherein a sub-item of the plurality of sub-items includes a portion of a body of a respective message.

6. The non-transitory computer-readable storage medium of claim 1, further including instructions for:
   detecting selection of a sub-item of the plurality of sub-items; and
   in response to detecting selection of the sub-item, replacing the representations of the two or more of the first plurality of messages in the second pane with at least a portion of a respective message corresponding to the selected sub-item.

7. The non-transitory computer-readable storage medium of claim 1, further including instructions for:
   detecting selection of a sub-item of the plurality of sub-items; and
   in response to detecting selection of the sub-item, scrolling a respective representation of the two or more of the first plurality of messages corresponding to the selected sub-item to a predetermined position in the second pane.

8. The non-transitory computer-readable storage medium of claim 1, wherein the plurality of items in the first pane, the representations of the two or more of the first plurality of messages represented by the first item in the second pane, and the representations of the two or more of the second plurality of messages represented by the second item in the second pane include read status indicators.

9. The non-transitory computer-readable storage medium of claim 1, wherein the first pane and the second pane are independently scrollable.

10. The non-transitory computer-readable storage medium of claim 1, further including instructions for:
    concurrently displaying, on the display, a mailbox pane adjacent to the first pane, wherein the mailbox pane includes selectable options for at least one of draft messages and sent messages.

11. The non-transitory computer-readable storage medium of claim 1, wherein a representation of a first message of the two or more of the first plurality of messages represented by the first item in the second pane includes a header associated with the first message and a picture adjacent to the header, the picture associated with the first message.

12. The non-transitory computer-readable storage medium of claim 1, further including instructions for:
    while displaying the plurality of items in the first pane, detecting selection of a sub-item of the plurality of sub-items in the first pane; and
    in response to detecting selection of the sub-item of the plurality of sub-items in the first pane, replacing, in the second pane, display of the representations of the two or more of the second plurality of messages represented by the second item with a single message corresponding to the selected sub-item without displaying representations of other messages from the plurality of sub-items in the second pane.

13. A method, comprising:
    at an electronic device with a display:
    concurrently displaying, on the display, a first pane and a second pane, wherein the first pane includes a plurality of items including a first item that represents a first plurality of messages and a second item that represents a second plurality of messages;

detecting selection of the first item of the plurality of items;

in response to detecting selection of the first item, displaying representations of two or more of the first plurality of messages represented by the first item in the second pane while maintaining display of the plurality of items in the first pane;

detecting a user input associated with the first item of the plurality of items in the first pane;

in response to detecting the user input associated with the first item of the plurality of items, displaying a plurality of sub-items in the first pane, the plurality of sub-items corresponding to a respective set of one or more messages of the first item;

while concurrently displaying the plurality of items in the first pane and the representations of the two or more of the first plurality of messages represented by the first item in the second pane, detecting selection of the second item of the plurality of items; and in response to detecting selection of the second item, replacing display of the representations of the two or more of the first plurality of messages represented by the first item with display of representations of two or more of the second plurality of messages represented by the second item while maintaining display of the plurality of items in the first pane.

14. The method of claim 13, wherein the plurality of items further includes a third item that represents a single message, the method further comprising:

in response to detecting selection of the third item displaying a representation of the single message represented by the third item in the second pane while maintaining display of the plurality of items in the first pane.

15. The method of claim 14, wherein:

the representation of the single message extends an entire width of the second pane, and the representations of the two or more of the first plurality of messages and the representations of the two or more of the second plurality of messages extend less than the entire width of the second pane.

16. The method of claim 13, wherein a sub-item of the plurality of sub-items includes a preview item indicating a sender or a date of a respective message.

17. The method of claim 13, wherein a sub-item of the plurality of sub-items includes a portion of a body of a respective message.

18. The method of claim 13, further comprising:

detecting selection of a sub-item of the plurality of sub-items; and in response to detecting selection of the sub-item, replacing the representations of the two or more of the first plurality of messages in the second pane with at least a portion of a respective message corresponding to the selected sub-item.

19. The method of claim 13, further comprising:

detecting selection of a sub-item of the plurality of sub-items; and in response to detecting selection of the sub-item, scrolling a respective representation of the two or more of the first plurality of messages corresponding to the selected sub-item to a predetermined position in the second pane.

20. The method of claim 13, wherein the plurality of items in the first pane, the representations of the two or more of the first plurality of messages represented by the first item in the second pane, and the representations of the two or more of the second plurality of messages represented by the second item in the second pane include read status indicators.

21. The method of claim 13, wherein the first pane and the second pane are independently scrollable.

22. The method of claim 13, further comprising:

concurrently displaying, on the display, a mailbox pane adjacent to the first pane, wherein the mailbox pane includes selectable options for at least one of draft messages and sent messages.

23. The method of claim 13, wherein a representation of a first message of the two or more of the first plurality of messages represented by the first item in the second pane includes a header associated with the first message and a picture adjacent to the header, the picture associated with the first message.

24. The method of claim 13, further comprising:

while displaying the plurality of items in the first pane, detecting selection of a sub-item of the plurality of sub-items in the first pane; and in response to detecting selection of the sub-item of the plurality of sub-items in the first pane, replacing, in the second pane, display of the representations of the two or more of the second plurality of messages represented by the second item with a single message corresponding to the selected sub-item without displaying representations of other messages from the plurality of sub-items in the second pane.

25. An electronic device, comprising:

a display;

a memory;

one or more processors coupled to the display and the memory, the memory including instructions executable by the one or more processors for:

concurrently displaying, on the display, a first pane and a second pane, wherein the first pane includes a plurality of items including a first item that represents a first plurality of messages and a second item that represents a second plurality of messages;

detecting selection of the first item of the plurality of items;

in response to detecting selection of the first item, displaying representations of two or more of the first plurality of messages represented by the first item in the second pane while maintaining display of the plurality of items in the first pane;

detecting a user input associated with the first item of the plurality of items in the first pane;

in response to detecting the user input associated with the first item of the plurality of items, displaying a plurality of sub-items in the first pane, the plurality of sub-items corresponding to a respective set of one or more messages of the first item;

while concurrently displaying the plurality of items in the first pane and the representations of the two or more of the first plurality of messages represented by the first item in the second pane, detecting selection of the second item of the plurality of items; and in response to detecting selection of the second item, replacing display of the representations of the two or more of the first plurality of messages represented by the first item with display of representations of two or more of the second plurality of messages represented by the second item while maintaining display of the plurality of items in the first pane.

26. The electronic device of claim 25, wherein the plurality of items further includes a third item that represents a single message, further including instructions for:
- in response to detecting selection of the third item displaying a representation of the single message represented by the third item in the second pane while maintaining display of the plurality of items in the first pane.

27. The electronic device of claim 26, wherein:
- the representation of the single message extends an entire width of the second pane, and the representations of the two or more of the first plurality of messages and the representations of the two or more of the second plurality of messages extend less than the entire width of the second pane.

28. The electronic device of claim 25, wherein a sub-item of the plurality of sub-items includes a preview item indicating a sender or a date of a respective message.

29. The electronic device of claim 25, wherein a sub-item of the plurality of sub-items includes a portion of a body of a respective message.

30. The electronic device of claim 25, further including instructions for:
- detecting selection of a sub-item of the plurality of sub-items; and
- in response to detecting selection of the sub-item, replacing the representations of the two or more of the first plurality of messages in the second pane with at least a portion of a respective message corresponding to the selected sub-item.

31. The electronic device of claim 25, further including instructions for:
- detecting selection of a sub-item of the plurality of sub-items; and
- in response to detecting selection of the sub-item, scrolling a respective representation of the two or more of the first plurality of messages corresponding to the selected sub-item to a predetermined position in the second pane.

32. The electronic device of claim 25, wherein the plurality of items in the first pane, the representations of the two or more of the first plurality of messages represented by the first item in the second pane, and the representations of the two or more of the second plurality of messages represented by the second item in the second pane include read status indicators.

33. The electronic device of claim 25, wherein the first pane and the second pane are independently scrollable.

34. The electronic device of claim 25, further including instructions for:
- concurrently displaying, on the display, a mailbox pane adjacent to the first pane, wherein the mailbox pane includes selectable options for at least one of draft messages and sent messages.

35. The electronic device of claim 25, wherein a representation of a first message of the two or more of the first plurality of messages represented by the first item in the second pane includes a header associated with the first message and a picture adjacent to the header, the picture associated with the first message.

36. The electronic device of claim 25, further including instructions for:
- while displaying the plurality of items in the first pane, detecting selection of a sub-item of the plurality of sub-items in the first pane; and
- in response to detecting selection of the sub-item of the plurality of sub-items in the first pane, replacing, in the second pane, display of the representations of the two or more of the second plurality of messages represented by the second item with a single message corresponding to the selected sub-item without displaying representations of other messages from the plurality of sub-items in the second pane.

* * * * *

UNITED STATES PATENT AND TRADEMARK OFFICE
CERTIFICATE OF CORRECTION

PATENT NO. : 10,310,728 B2  
APPLICATION NO. : 15/005959  
DATED : June 4, 2019  
INVENTOR(S) : Simon I. Bovet et al.

Page 1 of 1

It is certified that error appears in the above-identified patent and that said Letters Patent is hereby corrected as shown below:

On the Title Page

Column 1, next to "Assignee", delete "Apple, Inc." and insert -- Apple Inc. --.

In the Claims

Claim 2, Column 23, Line 55, delete "item" and insert -- item, --.

Signed and Sealed this  
Twenty-fourth Day of September, 2019

Andrei Iancu  
*Director of the United States Patent and Trademark Office*